(12) United States Patent
Vincent et al.

(10) Patent No.: US 10,713,362 B1
(45) Date of Patent: *Jul. 14, 2020

(54) DYNAMICALLY ADAPTIVE FRAMEWORK AND METHOD FOR CLASSIFYING MALWARE USING INTELLIGENT STATIC, EMULATION, AND DYNAMIC ANALYSES

(71) Applicant: FireEye, Inc., Milpitas, CA (US)

(72) Inventors: Michael Vincent, Sunnyvale, CA (US); Ali Mesdaq, San Jose, CA (US); Emmanuel Thioux, Santa Cruz, CA (US); Abhishek Singh, Morgan Hill, CA (US); Sai Vashisht, Union City, CA (US)

(73) Assignee: FireEye, Inc., Milpitas, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/912,474

(22) Filed: Mar. 5, 2018

Related U.S. Application Data

(60) Continuation of application No. 14/922,024, filed on Oct. 23, 2015, now Pat. No. 9,910,988, which is a
(Continued)

(51) Int. Cl.
*G06F 21/56* (2013.01)
*H04L 29/06* (2006.01)

(52) U.S. Cl.
CPC .......... *G06F 21/566* (2013.01); *G06F 21/562* (2013.01); *H04L 63/145* (2013.01); *H04L 63/1416* (2013.01); *G06F 2221/034* (2013.01)

(58) Field of Classification Search
CPC ................. G06F 21/566; G06F 21/562; G06F 2221/034; G06F 21/53; G06F 21/554;
(Continued)

(56) References Cited

U.S. PATENT DOCUMENTS

| 4,292,580 A | 9/1981 | Ott et al. |
|---|---|---|
| 5,175,732 A | 12/1992 | Hendel et al. |

(Continued)

FOREIGN PATENT DOCUMENTS

| GB | 2439806 A | 1/2008 |
|---|---|---|
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

(Continued)

*Primary Examiner* — Ali S Abyaneh
*Assistant Examiner* — Shu Chun Gao
(74) *Attorney, Agent, or Firm* — Rutan & Tucker, LLP

(57) ABSTRACT

A method of detecting malware in a specimen of computer content or network traffic is described. The method features conducting a first analysis on the specimen in accordance with a first plurality of analyses and an order of the first plurality of analyses. A second analysis is conducted on the specimen different than the first analysis type. Thereafter, further analyses on the specimen may be altered by modifying information associated with the first plurality of analyses or the order of the first plurality of analyses in response to feedback information based on results from at least the first analysis. The modified information changes a malware analysis of the specimen from being conducted in accordance with the first plurality of analyses to being conducted in accordance with a second plurality of analyses different in analysis type or in order of analyses than the first plurality of analyses.

52 Claims, 10 Drawing Sheets

Related U.S. Application Data division of application No. 14/042,420, filed on Sep. 30, 2013, now Pat. No. 9,171,160.

(58) Field of Classification Search
CPC ........ G06F 21/56; G06F 21/552; G06F 21/57; H04L 63/145; H04L 63/1416; H04L 51/12; H04L 63/1408; H04L 63/1441; H04L 63/1458; H04L 69/28; H04L 63/1433

See application file for complete search history.

(56) References Cited

U.S. PATENT DOCUMENTS

| | | | |
|---|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,653 B2 | 3/2011 | Brickell et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |

(56) References Cited

U.S. PATENT DOCUMENTS

| | | |
|---|---|---|
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,683,584 B1 | 3/2014 | Daswani et al. |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,863,288 B1 | 10/2014 | Savage et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,098,333 B1 * | 8/2015 | Obrecht .................. G06F 9/50 |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,165,142 B1 | 10/2015 | Sanders et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,378,361 B1 * | 6/2016 | Yen .................. G06F 21/55 |
| 9,398,028 B1 | 7/2016 | Karandikar et al. |
| 9,401,922 B1 * | 7/2016 | Walters ................... H04L 63/14 |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,501,639 B2 * | 11/2016 | Stolfo .................. G06F 21/554 |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B1 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,811,665 B1 * | 11/2017 | Xu ...................... G06F 21/562 |

(56) References Cited

U.S. PATENT DOCUMENTS

| | | |
|---|---|---|
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0037079 A1 | 2/2006 | Midgley |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |

(56) References Cited

U.S. PATENT DOCUMENTS

| | | |
|---|---|---|
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0253906 A1* | 11/2006 | Rubin ................ H04L 63/1416 726/23 |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0192863 A1 | 8/2007 | Kapoor et al. |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0109730 A1* | 5/2008 | Coffman ................ G06Q 30/02 715/733 |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044272 A1 | 2/2009 | Jarrett |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0254969 A1* | 10/2009 | Parker ................... G06F 21/554 726/1 |
| 2009/0265692 A1 | 10/2009 | Godefroid et al. |
| 2009/0271867 A1 | 10/2009 | Zhang |
| 2009/0282485 A1 | 11/2009 | Bennett |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0269095 A1 | 10/2010 | King et al. |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |

(56) References Cited

U.S. PATENT DOCUMENTS

| | | |
|---|---|---|
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222120 A1 | 8/2012 | Rim et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0311713 A1 | 12/2012 | Amit et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0091571 A1 | 4/2013 | Lu |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |
| WO | 2014057542 A1 | 4/2014 |

OTHER PUBLICATIONS

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Hiroshi Shinotsuka, Malware Authors Using New Techniques to Evade Automated Threat Analysis Systems, Oct. 26, 2012, http://www.symantec.com/connect/blogs/, pp. 1-4.

(56) References Cited

OTHER PUBLICATIONS

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Lastline Labs, The Threat of Evasive Malware, Feb. 25, 2013, Lastline Labs, pp. 1-8.
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
AltaVista Advanced Search Results. "attack vector identifier". Http://www.altavista.com/web/results?ltag=ody&pg=aq&aqmode=aqa=Event+Orch- estrator . . . , (Accessed on Sep. 15, 2009).
AltaVista Advanced Search Results. "Event Orchestrator". Http://www.altavista.com/web/results?ltag=ody&pg=aq&aqmode=aqa=Event+Orch- esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).

Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
EP 14781744.9 filed Apr. 29, 2016 Office Action dated Aug. 29, 2017.
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase © CMU, Carnegie Mellon University, 2007.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb—Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Leading Colleges Select FireEye to Stop Malware-Related Data Breaches, FireEye Inc., 2009.

(56) References Cited

OTHER PUBLICATIONS

Li et al., A VMM-Based System Call Interposition Framework for Program Monitoring, Dec. 2010, IEEE 16th International Conference on Parallel and Distributed Systems, pp. 706-711.
Liljenstam, Michael , et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
EP 14781744.9 filed Apr. 29, 2016 Office Action dated Oct. 19, 2018.
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J. , et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
PCT/US2014/055961 filde Sep. 16, 2014 International Search Report dated Jan. 5, 2015.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Spitzner, Lance , "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Appl. No. 14/042,420, filed Sep. 30, 2013 Notice of Allowance dated Jul. 30, 2015.
U.S. Appl. No. 14/042,420, filed Sep. 30, 2013 Non-Final Office Action dated Jan. 14, 2015.
U.S. Appl. No. 14/922,024, filed Oct. 23, 2015 Non-Final Office Action dated Mar. 21, 2017.
U.S. Appl. No. 14/922,024, filed Oct. 23, 2015 Notice of Allowance dated Nov. 15, 2017.
U.S. Appl. No. 14/922,030, filed Oct. 23, 2015 Final Office Action dated May 10, 2017.
U.S. Appl. No. 14/922,030, filed Oct. 23, 2015 Non-Final Office Action dated Nov. 9, 2016.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul , "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

DYNAMICALLY ADAPTIVE FRAMEWORK AND METHOD FOR CLASSIFYING MALWARE USING INTELLIGENT STATIC, EMULATION, AND DYNAMIC ANALYSES

CROSS-REFERENCE OF RELATED APPLICATIONS

This application is a continuation of U.S. patent application Ser. No. 14/922,024, filed Oct. 23, 2015, now U.S. Pat. No. 9,910,988, issued Mar. 6, 2018, which is divisional application of U.S. patent application Ser. No. 14/042,420 filed Sep. 30, 2013, now U.S. Pat. No. 9,171,160, issued Oct. 27, 2015, the entire contents of which are incorporated by reference.

FIELD OF THE INVENTION

Embodiments of the present invention relate generally to malicious content detection. More particularly, embodiments of the invention relate to malicious content detection using intelligent static and dynamic analyses.

BACKGROUND

Malicious software, or malware for short, may include any program or file that is harmful by design to a computer. Malware includes computer viruses, worms, Trojan horses, adware, spyware, and any programming that gathers information about a computer or its user or otherwise operates without permission. The owners of the computers are often unaware that these programs have been added to their computers and are often similarly unaware of their function.

Malicious network content is a type of malware distributed over a network via websites, e.g., servers operating on a network according to a hypertext transfer protocol (HTTP) standard or other well-known standard. Malicious network content distributed in this manner may be actively downloaded and installed on a computer, without the approval or knowledge of its user, simply by the computer accessing the web site hosting the malicious network content (the "malicious web site"). Malicious network content may be embedded within objects associated with web pages hosted by the malicious web site. Malicious network content may also enter a computer upon receipt or opening of email. For example, email may contain an attachment, such as a PDF document, with embedded malicious executable programs. Furthermore, malicious content may exist in files contained in a computer memory or storage device, having infected those files through any of a variety of attack vectors.

Various processes and devices have been employed to prevent the problems associated with malicious content. For example, computers often run antivirus scanning software that scans a particular computer for viruses and other forms of malware. The scanning typically involves automatic detection of a match between content stored on the computer (or attached media) and a library or database of signatures of known malware. The scanning may be initiated manually or based on a schedule specified by a user or system administrator associated with the particular computer. Unfortunately, by the time malware is detected by the scanning software, some damage on the computer or loss of privacy may have already occurred, and the malware may have propagated from the infected computer to other computers. Additionally, it may take days or weeks for new signatures to be manually created, the scanning signature library updated and received for use by the scanning software, and the new signatures employed in new scans.

Moreover, anti-virus scanning utilities may have limited effectiveness to protect against all exploits by polymorphic malware. Polymorphic malware has the capability to mutate to defeat the signature match process while keeping its original malicious capabilities intact. Signatures generated to identify one form of a polymorphic virus may not match against a mutated form. Thus polymorphic malware is often referred to as a family of virus rather than a single virus, and improved anti-virus techniques to identify such malware families is desirable.

Another type of malware detection solution employs virtual environments to replay content within a sandbox established by virtual machines (VMs). Such solutions monitor the behavior of content during execution to detect anomalies that may signal the presence of malware. One such system offered by FireEye®, Inc., the assignee of the present patent application, employs a two-phase malware detection approach to detect malware contained in network traffic monitored in real-time. In a first or "static" phase, a heuristic is applied to network traffic to identify and filter packets that appear suspicious in that they exhibit characteristics associated with malware. In a second or "dynamic" phase, the suspicious packets (and typically only the suspicious packets) are replayed within one or more virtual machines. For example, if a user is trying to download a file over a network, the file is extracted from the network traffic and analyzed in the virtual machine. The results of the analysis aids in determining whether the file is malicious. The two-phase malware detection solution may detect numerous types of malware and, even malware missed by other commercially available approaches. Through verification, the two-phase malware detection solution may also achieve a significant reduction of false positives relative to such other commercially available approaches. Dealing with false positives in malware detection may needlessly slow or interfere with download of network content or receipt of email, for example. This two-phase approach has even proven successful against many types of polymorphic malware and other forms of advanced persistent threats.

Typically, the static phase and the dynamic phase are performed in sequence, in which a static analysis is performed followed by a dynamic analysis, to generate separate scores with limited or no influence from each other. The scores are then used to determine the final malware score of the content for content classification. The static or dynamic phase may be performed in an operating environment that may not be correct and/or necessary. For example, a dynamic analysis may be performed on the content for specific types and/or versions of operating systems and/or applications executing within a virtual environment, even if a static analysis reveals that the content is intended for a particular version of a particular type of operating system and/or application. As a result, drawbacks of known two-phase malware detection solutions include a certain inflexibility and inefficiency in performing the analysis.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1A:
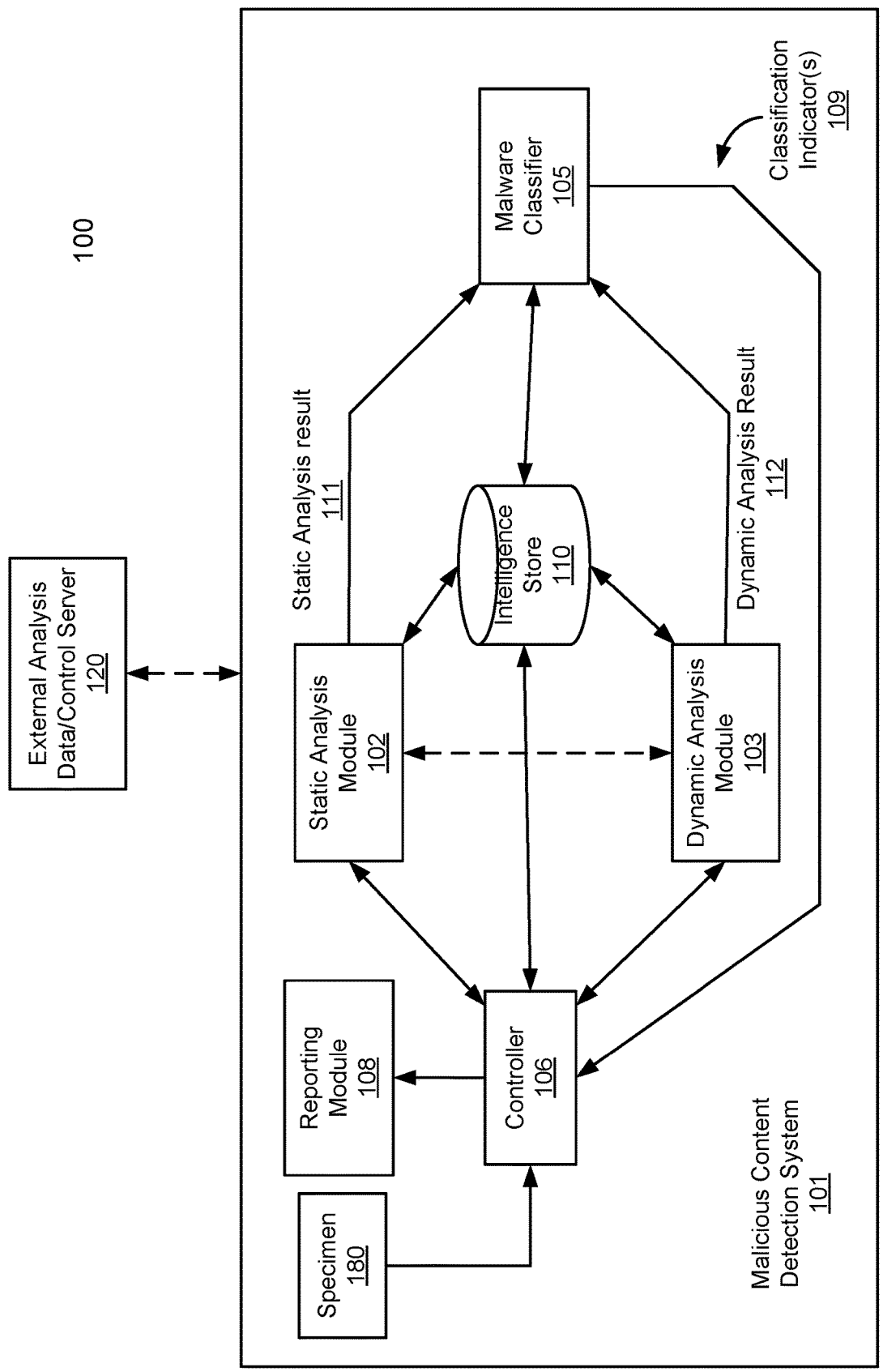
FIGS. 1A and 1B are block diagrams illustrating a malware detection system according to certain embodiments of the invention.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for malware detection using intelligent static analysis and dynamic analysis are described herein. According to one embodiment, a malware detection system includes, but is not limited to, a first analysis module (e.g., a static analysis module), a second analysis module (e.g., a dynamic analysis module), a malware classifier, and a controller. In response to receiving a specimen (e.g., a content item such as a data object or file to be analyzed) for malware detection, the controller determines an analysis plan for analyzing whether the specimen should be classified as malware. The analysis plan identifies at least a first analysis and possibly plural analyzes, along with an order and, in some embodiments, an analysis "protocol" for performing the analysis. For example, the analysis plan may specify a first analysis and a second analysis to be performed, which may be a static analysis and/or a dynamic analysis, and the order in which they are to be performed. In some embodiments, the analysis plan may also specify an analysis protocol and parameters, such as a specific operating environment to be provided or specific behaviors to be monitored in the dynamic analysis, specific types of static analyses, or specific characteristics to be checked, verified or examined via static analysis.

Where the analysis plan specifies two analyses, e.g., a first and second analysis, the first analysis may be performed by the first analysis module according to the analysis plan, for example, to identify one or more suspicious indicators and one or more characteristics related to processing of the specimen. A second analysis may be performed by the second analysis module in accordance with the analysis plan on the specimen, for example, to identify one or more unexpected behaviors that include one or more processing or communications anomalies. The results of the first and second analyses are provided to the classifier. The classifier is to classify the specimen based on the identified suspicious indicators and the anomalies. The analysis plan and all the information generated from the first and second analysis and the classification are stored in a persistent storage (which may be located locally and/or remotely), including the suspicious indicators, characteristics, information describing the unexpected and/or expected behaviors, as well as the specimen itself and the metadata describing the circumstances surrounding the specimen (e.g., email or Web information through which the specimen was received).

The controller uses the stored information to determine what, if any, additional analysis or analyses should be performed, and, often, what protocols should be followed during the subsequent testing. The sequence order of the analyses involved may be determined by the controller as part of the analysis plan, or update to the analysis plan. In one embodiment, the controller monitors or receives feedback from the analysis modules and the classifier, and may modify or adjust the analysis plan based on the results of a prior analysis and classification, including configuring an additional analysis between or after the first and second analysis or modifying a procedure or operating environment of the next analysis in the analysis plan.

Accordingly, the first analysis may be performed prior to the second analysis, where the second analysis may be performed based in part, for example, on the information or results generated from the first analysis, such as suspicious indicators and characteristics. Alternatively, the second analysis may be performed prior to the first analysis, where the first analysis may be performed based in part, for example, on at least one of the anomalies identified during the second analysis. Some embodiments of the invention may improve over the known two-phase malware detection solutions by providing a third type of analysis involving emulation as a simpler, more time efficient method of analysis than the dynamic analysis involving a virtual machine, either in lieu of or in addition to dynamic analysis. Such three-phase malware detection solutions provide additional options for the controller in conducting analysis.

As a result, embodiments of the invention may perform malware detection with greater flexibility in the conduct of the analysis, and realize greater efficiencies with improved efficacy in detecting malware than in known two-phase malware detection solutions.

With reference now to the drawings, FIG. 1A is a block diagram illustrating a malware detection system according to one embodiment of the invention. Referring to FIG. 1A, system 100 includes malicious content detection system 101 configured to receive a specimen or specimens 180 from a source (not shown) and to determine whether the specimen 180 should be classified as malicious. The term of specimen represents one or more data objects or a file (e.g., an executable, a document, a library, a media file), which may be suspicious or unknown. The specimen may be network content transmitted by a network node over a network (e.g., a local area network, a wide area network or the Internet, or a combination thereof) and captured by a network device such as a network tap. Alternatively, the specimen may be manually submitted by a user via a user interface (e.g., a Web portal). In one embodiment, malicious content detection system 101 includes, but is not limited to, static analysis module 102 (also referred to as static analysis logic or static analyzer), dynamic analysis module 103 (also referred to as dynamic analysis logic or dynamic analyzer), malware classifier 105, controller 106 (also referred to as control logic), and intelligence store or database 110.

Static analysis module 102 is to perform a static analysis on the specimen 180 without executing or playing the specimen. A static analysis may include signature match, protocol semantics anomalies check, source reputation check, malware source blacklist or whitelist checking, and/ or emulation. Dynamic analysis module 103 is to perform a dynamic analysis on the specimen, including monitoring behaviors of the specimen 180 during its virtual execution to detect any unexpected behaviors having one or more anomalies. Malware classifier 105 is to classify whether the specimen is likely malicious based on the results of the static analysis and dynamic analysis, and other information such as information stored in the intelligence store 110. Controller 106 is to coordinate the operations of the static analysis module 102, the dynamic analysis module 103, and the classifier 105, including controlling the processing flows amongst them via an analysis plan or a feedback received from any of the static and dynamic analysis modules 102-103 and classifier 105. The controller 106 is to determine in an analysis plan whether one or both of the analysis modules 102-103 should be involved, the order of the analysis modules 103-103 involved (which may be in series or in parallel), whether additional analysis is needed based on the feedback from the classifier 105 and the intelligence information stored in the intelligence store 110. Effectively, controller 106 determines an analysis plan or roadmap for static analysis module 102, dynamic analysis module 103, and malware classifier 105. Although two analysis modules are shown in FIG. 1A, more or fewer analysis modules or other components may also be implemented.

According to one embodiment, the information stored in the intelligence store 110 (e.g., a persistent database) is accessible and used by each of the components of the malware detection system (e.g., static analysis module 102, dynamic analysis module 103, malware classifier 105, and controller 106) during all processing stages of malware detection processes. Each of the components may utilize the information stored in the intelligence store 110 during their respective processes. Each of the components may generate and store further intelligence information in the intelligence store 110 during their respective processes, which may be utilized in subsequent operations. The intelligence information stored in the intelligence store 110 includes a variety of information obtained during the current malware detection session and prior malware detection sessions (if any), and/or other information received or updated from other information sources, such as external analysis data and control server 120 in the cloud (e.g., over the Internet). The intelligence information may include metadata of the specimen, information concerning the circumstances surrounding the specimen (e.g., environment in which the specimen is received such as email or Web information), information observed or learned during the operations of each of the components of the malware detection system, and/or other information obtained from other malware detection systems with respect to the same or similar specimen. The specimen itself may also be cached in the intelligence store 110.

At least some of the components such as controller 106 may be equipped with a logger to log all the events or activities occurred during the processes of the respective components. The logged information may also be stored in intelligence store 110 and accessible by all components. As a result, each of the components of the malware detection system has all the intelligence information available from the intelligence store 110 during the corresponding stage of processes and it can perform a more comprehensive and accurate analysis in view of all the intelligence information generated from the past and current malware detection sessions. Since all components share all of the intelligence information, they effectively are on the "same page," and communicate with one another (e.g., feedback), which enables each component to make intelligent decisions to improve the efficiency and accuracy of the malware detection. The information stored in intelligence store 110 may be stored in a persistent storage device (e.g., hard drive or flash memory device) and loaded in the system memory during the malware detection. The information stored in intelligence store 110 may be synchronized from time to time with a central management server such as server 120 for further analysis (e.g., offline analysis) and for sharing of information with other malicious content detection systems. For example, controller 106 may determine that the specimen has characteristics, identifiers, or behaviors that merit sending the specimen outside of the customer's network or sub-network (e.g., to a remote or centralized location, which may provide cloud-based subscription services) for additional (e.g., factory) processing, should the customer opt-in to this option.

In response to receiving a specimen for malware detection, the controller 106 determines an analysis plan for analyzing whether the specimen should be classified as malware. The specimen may be recently captured or received from a remote source or alternatively, it can be the same specimen that has been processed during a previous iteration of malware detection processes. Controller 106 determines a next analysis based on the received specimen and the results of a prior analysis. Controller 106 records this analysis decision in the analysis plan and the results of all analysis are stored in the memory in association with a specimen identifier identifying the received specimen. A specimen identifier may be a filename or other identifying information. The analysis plan identifies at least one analysis to be performed, for example, for purposes of the following discussion, a first and second analysis, each of which may be a static analysis and/or a dynamic analysis. A first analysis (e.g., static analysis) is then performed by the first analysis module (e.g., static analysis module 102) according to the analysis plan to identify one or more suspicious indicators and one or more characteristics related to processing of the specimen. In addition, certain non-suspicious indicators (e.g., predefined data patterns) may also be tracked. A second analysis (e.g., dynamic analysis) is performed by the second analysis module (e.g., dynamic analysis module 103) in accordance with the analysis plan on the specimen to identify one or more unexpected behaviors that include one or more processing or communications anomalies. Similarly, certain expected behaviors may also be recorded. The classifier 105 is to classify the specimen based on the identified suspicious indicators and the anomalies. The analysis plan and all the information generated from the first and second analysis and the classification are stored in a persistent storage, such as intelligence store 110 or external server 120.

The first analysis may be performed prior to the second analysis, where the second analysis may be performed based in part on the information or results generated from the first analysis, such as suspicious indicators and characteristics. Alternatively, the second analysis may be performed prior to the first analysis, where the first analysis may be performed based in part on at least one of the anomalies identified during the second analysis. Furthermore, controller 106 may perform an initial analysis or scanning on the received specimen and may decide to dispatch the specimen for both analysis modules 102-103 for static and dynamic analyses in parallel. In one embodiment, the controller 106 monitors or receives feedback from at least one of the analysis modules 102-103 and the classifier 105. Controller 106 may modify or adjust the analysis plan based on the results of the analysis and the classification, including configuring and initiating an additional analysis (e.g., static or dynamic analysis) between or after the first and second analysis or modifying a procedure (e.g., protocol) or environment settings of the next analysis in the analysis plan. Controller 106 may further specify the order of multiple analyses listed in the analysis plan. The analysis plan may be updated and maintained in the intelligence store 110.

In one embodiment, after performing a static analysis before performing a dynamic analysis, controller 106 may alter the analysis plan based on the result of the static analysis, as well as other information obtained from the intelligence store 110. Controller 106 may decide to perform an additional analysis, e.g., by adding processing of the specimen in an emulation analysis module to unpack an object and then another static analysis on the unpacked object. The dynamic analysis is then performed pursuant to the analysis plan based in part on the results of the inserted static analysis. Thus, a result of one analysis or operation may provide an influence to a subsequent analysis or operation. The influence may be any information or data that affects or alters the decision making regarding a subsequent analysis or the conduct or operation of the malware detection process during that subsequent analysis. For example, the influence generated by a static analysis on a subsequent dynamic analysis may include the runtime environment used by the subsequent dynamic analysis, including a type of operating system and its version, type of specimen (e.g., executable, PDF, Web, WORD), applications involved (e.g., browser), etc., the length of time to conduct a dynamic analysis on the specimen, or the type of behaviors to be monitored, or the type or location of monitors (or monitor instrumentation) to deploy. These are examples of the analysis protocol and parameters referred to above.

According to one embodiment, controller 106 may modify the priorities of the specimens to be analyzed in the analysis plan based on the information observed (from the intelligence store) at the point in time. Initially, for example, when the specimens are received for malware detection, controller 106 may perform an initial analysis on the specimens, associate a priority with each of the specimens, and set an order of the analyses to be performed in an analysis plan. After a first analysis (e.g., static analysis), controller 106 may modify the priorities of the specimens and/or the order of the analyses in the analysis plan based on the result of the first analysis. Controller 106 may further configure the time or analysis schedule for each of the analyses to be performed in the analysis plan. The time or analysis schedule information may also be stored in the analysis plan. Controller 106 then dispatches the specimens to be analyzed according to the analysis schedule or time specified in the analysis plan.

According to another embodiment, after a static analysis has been performed, based on the result of the static analysis, controller 106 may select a runtime environment of a dynamic analysis that is supposed to be performed after the static analysis. For example, controller 106 may determine an operating system and version thereof, an application and version thereof for the virtual environment of the dynamic analysis. Controller 106 may further select an initial state from which the application will be run based on the result of the static analysis. Controller 106 may alter the analysis plan to reflect such changes.

According to another embodiment, any results (e.g., events), activities, and/or decision makings of all of the components may be recorded (for example, by controller 106, or by the individual components themselves) in the analysis plan or an analysis log, which may be stored in database 110 and/or external storage 120. The recorded information may be stored in database 110, which may be indexed based on identifiers of the specimen. Controller 106 may determine a next analysis based on prior analysis results and dispatch the specimen to one or both of analysis modules 102-103 via a virtual switch, where the virtual switch is operated based on certain events or conditions maintained by the intelligence store 110. Controller 106 may also determine the length of a dynamic analysis and specific software to run therein, including an operating system, applications, libraries, plugins, and versions thereof based on the specimen or one or more prior analyses. Controller 106 may continue directing a further analysis or terminate the current analysis after a period of time, which may be determined based on a number of pending specimens.

In one embodiment, a static analysis may be performed in view of the intelligence information stored in intelligence store 110. A static analysis may include signature match, protocol semantics anomalies check, source reputation check and/or emulation. Static analysis module 102 further extracts information from the specimen that describes the specimen. The extracted information is stored in intelligence store 110. Static analysis module 102 may further generate intelligence information during the static analysis and store the intelligence information in intelligence store 110. Static analysis result 111 may also be stored in intelligence store 110. Static analysis module 102 may further perform an analysis based on a set of heuristics and to generate a static score representing the likelihood that a specimen is malicious based on the static analysis. The static score may be a measure of probability of malware and used in part by malware classifier 105 to classify the specimen.

In one embodiment, the specimen is statically inspected by static analysis module 102 for various attributes and "features." These features are intended to be signals to both goodness and badness of the specimen. For example if a file contains a Microsoft® WORD® icon as its own display icon, this may "look" suspicious since that is a common malware technique to trick a user into opening the file. During the subsequent dynamic analysis, the file is dynamically analyzed by dynamic analysis module 103 for various behavioral actions, and it may be discovered that the file may not be opened by Microsoft WORD and/or may perform activities (e.g., behaviors) that are not expected of a WORD document. The "intelligent" aspect of the dynamic analysis is that the information from the static analysis can be used to help or influence the dynamic analysis. Such information may be stored in intelligence store 110.

Dynamic analysis module 103 is configured to monitor the behaviors of the specimen in an operating environment (e.g., virtual machine), generating a dynamic analysis result 112. Dynamic analysis result 112 may include information describing or indicating the unexpected and/or expected behaviors observed during the dynamic analysis. Dynamic analysis result 112 may be stored in the intelligence store 110 as well. The dynamic analysis may be configured and performed in view of the intelligence information obtained from the intelligence store 110. Dynamic analysis module 103 may further generate and store further intelligence information in intelligence store 110 during the dynamic analysis. Dynamic analysis module 103 may further generate a dynamic score representing the likelihood that specimen is malicious based on the dynamic analysis, which may be in a form of a measure of probability. Static analysis result 111 and dynamic analysis 112 are used by malware classifier 105 to determine, in view of the intelligence information obtained from the intelligence store 110, a malware classification indicator 109 that indicates whether the specimen is malicious, non-malicious, or uncertain, which may also be stored in the intelligence store 110. Malware classification indicator 109 may be in a form of confidence score.

Malware classification indicator 109 is fed back to controller 106 to determine whether the malware classification indicator 109 is sufficient or conclusive enough to classify the specimen. If so, controller 106 may terminate the analysis and reporting module 108 is invoked to report whether the specimen is indeed malware or non-malware. In the event the specimen is malware, a malware signature or malware identifier may also be generated for future detection. In the event the malware classification indicator 109 indicates the specimen is uncertain, controller 106 may configure additional analysis to be performed. Controller may further determine certain parameters or environment settings for the additional analysis based on the intelligence information obtained from the intelligence store 110. Controller 106 may further extend the clock time based on the results being obtained in the dynamic analysis or launch another dynamic analysis in response to those results.

According to one embodiment, the static analysis and dynamic analysis performed by static analysis module 102 and dynamic analysis module 103 may be performed in sequence (configured via an analysis plan) in which an analysis result of an analysis (e.g., static analysis) may be utilized, for example, via intelligence store 110, by a subsequent analysis (e.g., dynamic analysis) to improve the efficiency and accuracy of the subsequent analysis. In one embodiment, when a specimen is received, for example, via a network tap, for malware detection, controller 106 determines which of the static analysis and dynamic analysis should be performed first. For certain types of content (e.g., portable document format (PDF), a dynamic-linked library (DLL)), a static analysis may be performed first and a dynamic analysis may then be performed. For other types of content (e.g., Web page or an executable), a dynamic analysis may be performed prior to a static analysis.

According to one embodiment, an analysis module generates further intelligent information concerning the content in question, such as a type of content, and/or an operating system and its version in which the content is intended to be executed. Such intelligent information is utilized by another analysis module to perform a subsequent analysis in a manner specifically tailored to the content in question. For example, the result of a static analysis can be used to configure an operating environment that is specifically tailored to the content for the dynamic analysis.

According to one embodiment, if controller 106 determines that there is a discrepancy between intelligent information provided by static analysis module 102 and dynamic analysis module 103 (which may be stored in intelligence store 110 or received via an application programming interface or API), it may configure additional analysis to be performed. For example, a first static analysis may reveal a first set of features of a specimen in question. However, after a first dynamic analysis on the same specimen is performed, it may reveal a second feature that has not been detected by the first static analysis. The second feature may have been intentionally hidden by a developer or a provider of the specimen (e.g., a malware author). Such a discrepancy may be determined by controller 106 and/or classifier 105 as a red flag, for example, based on prior statistics collected over a period of time. In such a situation, controller 106 may determine that a further analysis is needed. As a result, a second static analysis may be performed on the specimen in view of the second feature discovered by the first dynamic analysis. The second static analysis may further require a second dynamic analysis to follow.

According to one embodiment, in addition to determining suspicious indicators, static analysis module 102 may further capture non-suspicious indicators, which may be user configurable. The non-suspicious indicators may also be stored in the intelligence store 110. Similarly, in addition to capturing the unexpected behaviors, dynamic analysis module 103 may further record expected behaviors and store the recorded information in the intelligence store 110. For example, if a specimen goes out-of-its-way to look normal during a static analysis, producing non-suspicious indicators, any unexpected behavior detected during a subsequent dynamic analysis may be considered with more weights, since it constitutes discrepancy between the two analyses.

According to one embodiment, in addition to the analysis results 111-112, other information generated by other components (e.g., information stored in the intelligence store 110) may also be presented or available to malware classifier 105. For example, the specimen itself, as well as its environment (e.g., associated email, Web information, and/or related file(s)) may also be presented or available to malware classifier 105.

According to one embodiment, controller 106 may determine, in the middle of a malware detection session based on the information observed, that the current analysis plan was not configured correctly. Controller 106 may decide to abort or abandon the current analysis plan completely and initiate another analysis plan or alternatively, take some correction or recovery actions before continue the current analysis plan. Furthermore, controller 106 may take into account the work load of the malware detection system and may decide to offload the analyses to an offline facility for malware analyses.

According to one embodiment, the number of specimens or the network, email, file work load of the system may also be provided to the malware classifier 105. The type of deployment may also be provided to the malware classifier 105. The controller 106 may determine that specimen has characteristic, identifiers, or behavior that merit sending the specimen outside of the customer's network for additional factory processing, should the customer opt-in to this option.

Note that the configuration of malware detection system 101 is described and shown in FIG. 1A for the purpose of illustration only. More or fewer components or other configurations may be implemented. For example, at least some of the functionalities of classifier 105 may be integrated with controller 106, or vice versa. Each of static analysis module 102, dynamic analysis module 103, and classifier 105 may maintain a separate communications channel (e.g., interprocess call or API as a feedback channel) with controller 106 to communicate with each other. Alternatively, they can communicate with each other via the intelligence store 110 by storing communications information in predetermined storage location(s) of the intelligence store 110 that are shared amongst them. Each of static analysis module 102, dynamic analysis module 103, controller 106, and classifier 105 may be implemented in software, hardware, or a combination thereof. For example, at least some of these components may be implemented as machine-readable code that can be executed by a processor in a memory to carry out the functionalities or operations as described above. Intelligence store 110 may be maintained in a non-volatile storage device such as a hard disk.

Note that an analysis plan may be a formal analysis plan and alternatively, the analysis plan may simply map to some specimen identifiers, one or more analyses, and/or information related to the specimen and the analyses. An analysis plan can be configured or programmed using a variety of programming languages such as extensible markup language (XML) or other scripting languages. The analysis plan may be updatable via a user interface or an API.

Figure 1B:
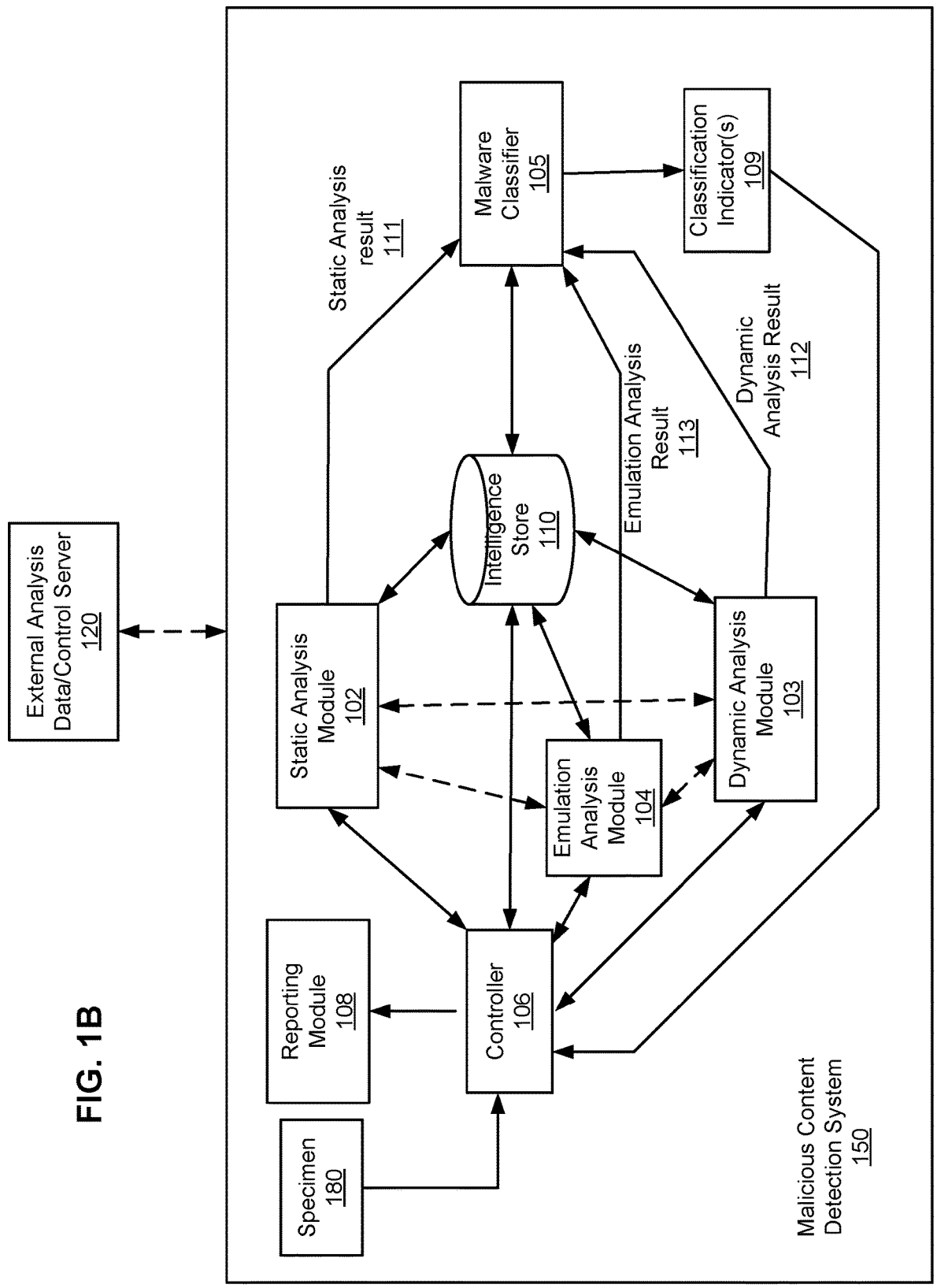

FIG. 1B is a block diagram illustrating a malware detection system according to another embodiment of the invention. Referring to FIG. 1B, in addition to those components, such as, controller 106, static analysis module 102, dynamic analysis module 103, malware classifier 105, and intelligence store 110 as shown in FIG. 1A, system 150 further includes an emulation analysis module (also referred to as an emulator or emulation logic) 104 for performing an emulation analysis on a specimen to generate an emulation analysis result 113. Emulation analysis module 104 is communicatively coupled to controller 106, static analysis 102, dynamic analysis module 103, malware classifier 105, and intelligence store 110. In one embodiment, emulation analysis module 104 is configured to emulate operations associated with the processing of a particular specimen in context with an emulated computer application (rather than a "real" application, as may be run in a virtual machine in the dynamic analysis) or in context with an emulated dynamic library. As an optional feature, emulation analysis module 104 may provide the list of functions and other features on which malware checks can be applied in later analyses, and/or information regarding a suitable operating environment to be employed in a virtual machine for dynamic analysis. For example, the emulation analysis module 104 may identify a particular version of an application having a vulnerability targeted the specimen, and the dynamic analysis will then employ that particular version within the virtual environment. This may lead to additional malware indicators and information regarding an attack, which may be stored in the intelligence store 110.

Emulation analysis module 104 is configured to emulate operations of an object and monitor for anomalous behavior. The monitoring may be accomplished by "hooking" certain functions associated with that object (e.g., one or more APIs, etc.), and controlling what data is specifically returned in response to corresponding function calls (e.g., force return of an application version number different than its actual number). After receipt of the returned data, operations by the object are monitored. For instance, the output from the object may be analyzed to determine if a portion of the output matches any of the malware identifiers.

Figure 2:
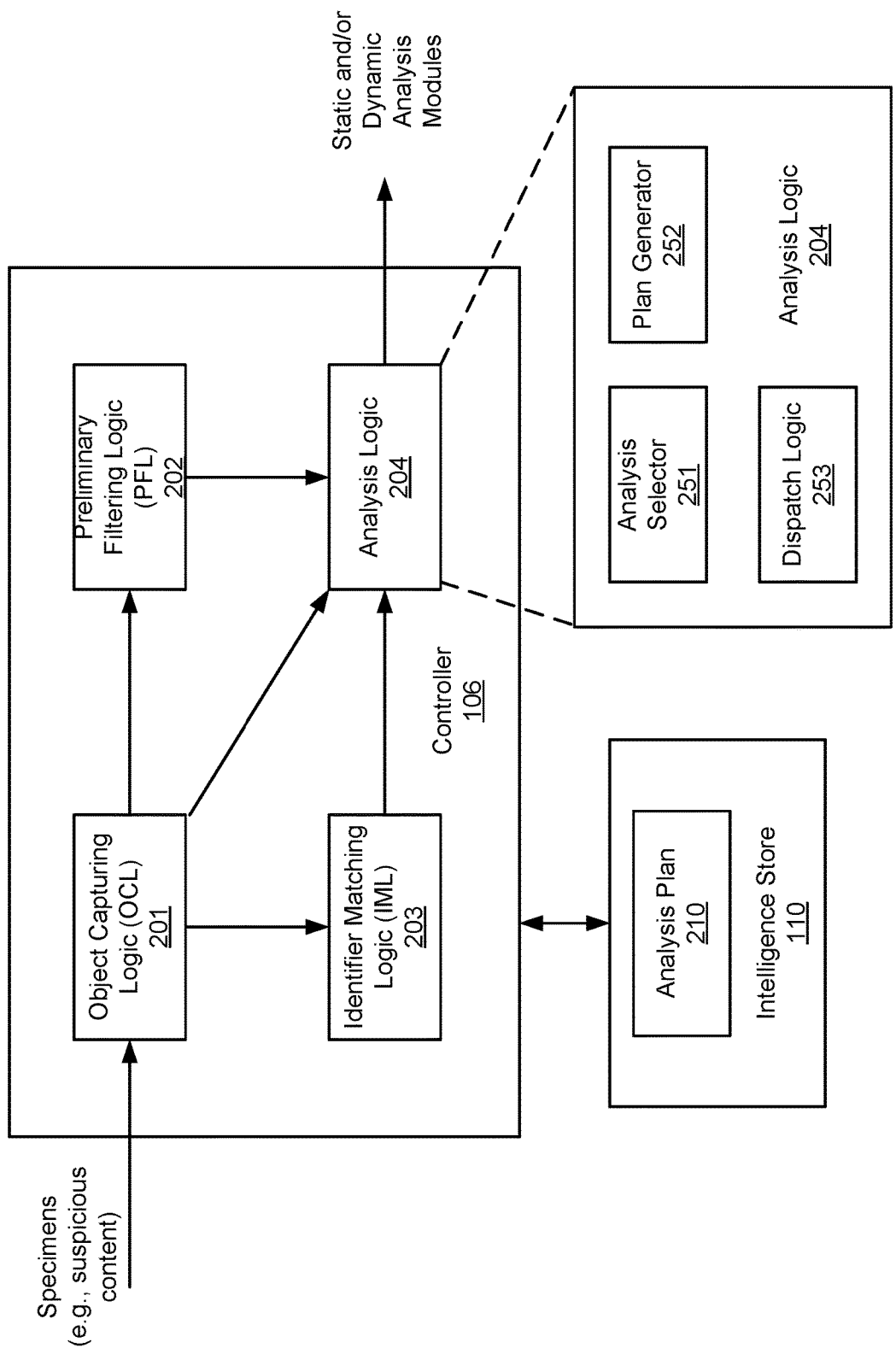
FIG. 2 is a block diagram illustrating an example of a controller according to one embodiment of the invention.

FIG. 2 is a block diagram illustrating an example of a controller according to one embodiment of the invention. Referring to FIG. 2, controller 106 includes, but is not limited to, object capturing logic 201, preliminary filtering logic 202, identifier matching logic 203, and analysis logic 204. Object capturing logic 201 is to fetch or capture a specimen from a content source. The specimen can be Web content, email attachment, or manually submitted content for malware detection. In addition, object capturing logic 201 is to determine or capture certain metadata concerning the circumstances surrounding the specimen. For example, if the specimen is an attachment from an email, certain email attributes, such as, email address(es), SUBJECT field, TO/FROM field, time and date of the email, etc. may be captured. If the specimen is part of Web download, the universal resource locator (URL), domain name, universal resource identifier (URI), type of request chain, protocols, etc. may be captured. In addition, the filename, size, file server from which the file is received, as well as other related files may also be captured. The captured information may be stored in intelligence store 110. Preliminary filtering logic 202 is to perform a preliminary filtering operation on the specimen to determine the type of the specimen (e.g., EXE, PDF, EXCEL, WORD files).

According to one embodiment, identifier matching logic 203 is to match the identifying information of the specimen with a list of identifiers identifying a set of known malware (e.g., black list) and a set of known non-malware (e.g., white list). The list of identifiers may be collected based on prior malware detection and periodically updated from a centralized server in the cloud. If the specimen is identified as one of the matched identifiers in the list, the specimen can be classified right away as either malware or non-malware, without having to perform a further analysis. The identifiers or identifying information may include URLs, observed behaviors, characteristics, features, hash of a malicious object, reputation indicators from third-party reputation service as applied to known malicious sources (e.g., URLs, domain names).

According to one embodiment, analysis logic 204 includes an analysis selector 251, a plan generator 252, and dispatch logic 253. Analysis selector 251 is to select which of the static analysis, dynamic analysis, emulation analysis and classification should be performed. Plan generator 252 is to configure and generate an analysis plan having one or more selected analyses and/or emulation therein. Plan generator 252 is to decide which one or both or how many of a static analysis and dynamic analysis (and emulation analysis, depending on the embodiment) are needed, their sequence order of such analyses to be performed, and other protocol and parameters of these analyses. Plan generator 252 may decide based on a set of rules (not shown), which may be user configurable locally or remotely via a user interface (e.g., command line interface or CLI) and from time to time updated from an external source. Dispatch logic 253 may configure a VM with a set of parameters based on the information provided by object capturing logic 201 and/or preliminary filtering logic 202, based on the customer's specific requirements, or results of prior analysis or analyses. Dispatch logic 253 then dispatches the analysis tasks to any of the analysis modules and classifier in accordance with the analysis plan. All of the information generated from object capturing logic 201, preliminary filtering logic 202, identifier matching logic 203, and Dispatch logic 253 may become part of analysis plan 210 stored in intelligence store 110.

Figure 3:
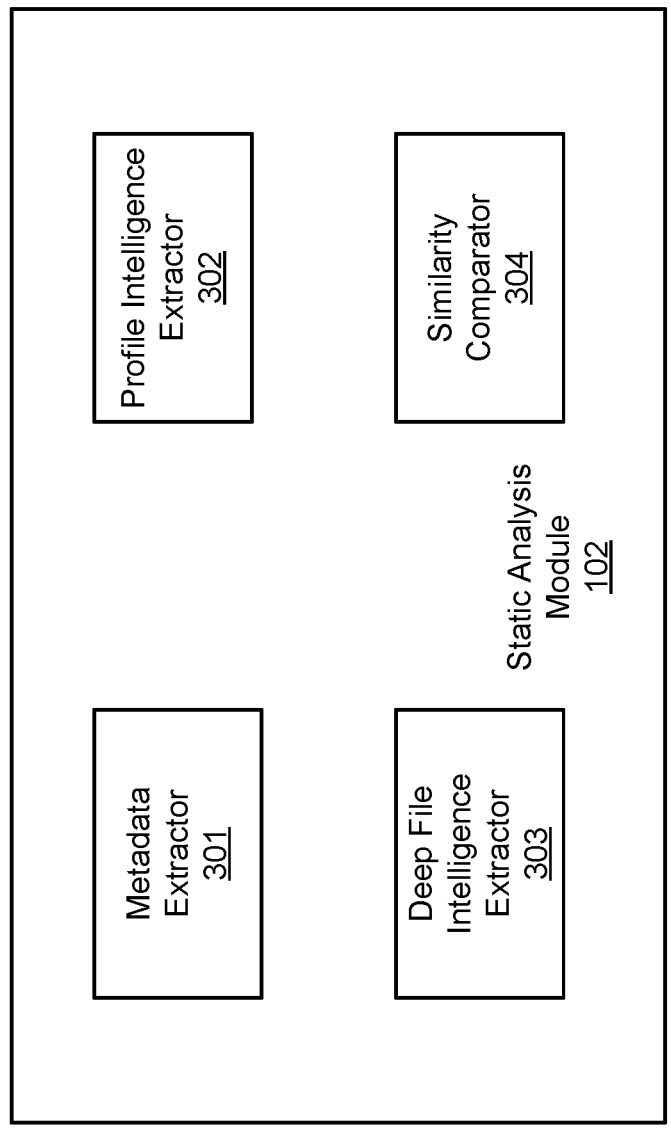
FIG. 3 is a block diagram illustrating a static analysis module according to one embodiment of the invention.

FIG. 3 is a block diagram illustrating a static analysis module according to one embodiment of the invention. Referring to FIG. 3, static analysis module includes metadata extractor 301, profile intelligence extractor 302, deep file intelligence extractor 303, and similarity comparator 304. According to one embodiment, metadata extractor 301 is to extract general metadata from a file. General metadata includes higher level information such as a filename, size, and file structure. Profile intelligence extractor 302 is to extract profile information of the file, including runtime software environment used for processing the file in a virtual environment. Deep file intelligence extractor 303 is to extract a deep object type associated with the file, such as, for example, an embedded object or image within the file. Similarity comparator 304 is to compare the extracted information with prior known information (as may be obtained from, for example, the intelligence store 110) to determine whether the file has been "seen" before. All of the extracted information and comparison information may be stored in a persistent storage such as intelligence store 110, and based on this information, static analysis module 102 produces one or more suspicious indicators if the file is determined to be suspicious.

Figure 4:
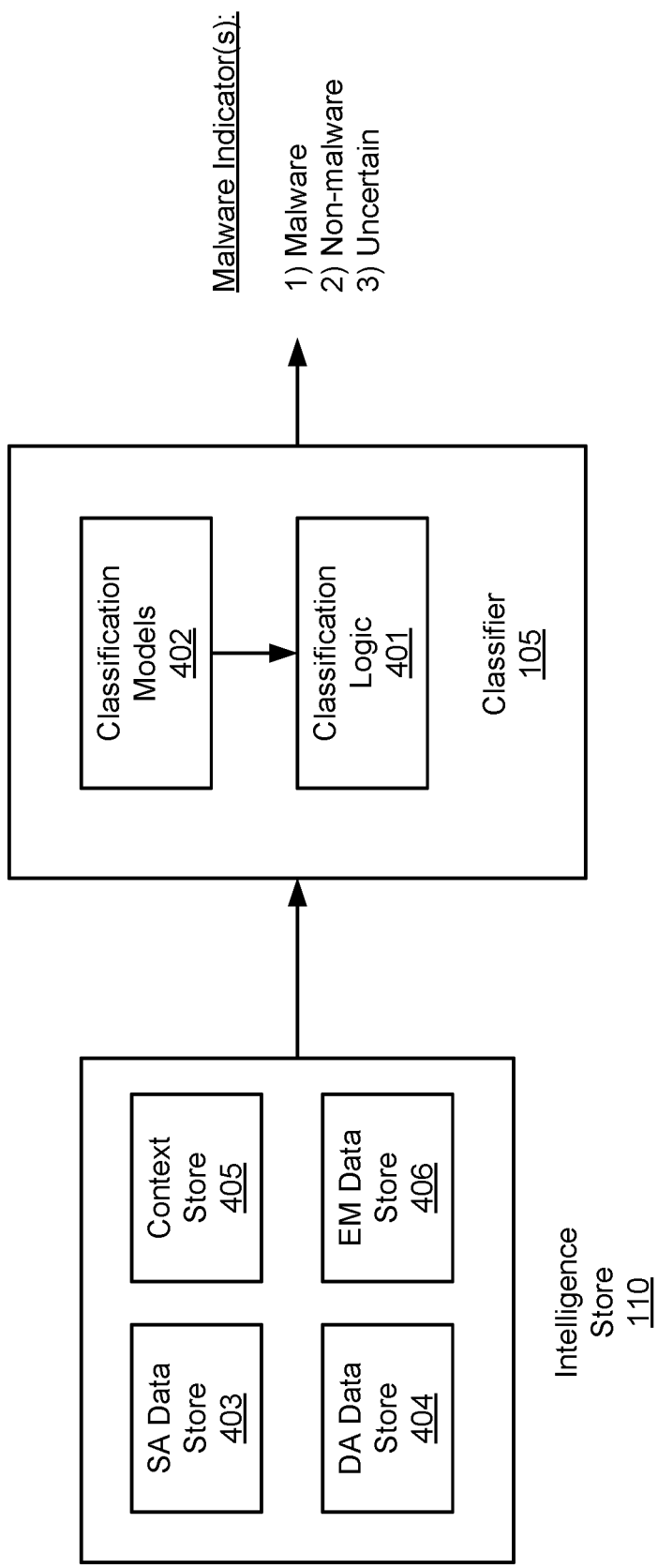
FIG. 4 is a block diagram illustrating a malware classifier according to one embodiment of the invention.

FIG. 4 is a block diagram illustrating a malware classifier according to one embodiment of the invention. Referring to FIG. 4, classifier 105 includes classification logic 401 and one or more classification models 402. In one embodiment, classification logic 401 examines a static analysis result and/or a dynamic analysis result, in view of all the information stored in intelligence store 110. Classification logic 401 may apply at least some of the suspicious indicators and/or characteristics produced from the static analysis and behavioral information produced from the dynamic analysis, as well as other information from intelligence store 110, to the models 402 to classify the specimen, which may produce one of malware, non-malware, and uncertain indicators.

In one embodiment, intelligence store 110 may include static analysis data store 403 to store any data generated from a static analysis (which may include the static analysis result), dynamic analysis store 404 to store any data generated from a dynamic analysis (which may include the dynamic analysis result), emulation analysis store 406 (which may include the emulation analysis result), and a context store 405 storing any context information, for example, generated from controller 106. Models 402 may be periodically trained and updated, for example, from an external centralized server.

The techniques described above can be applied in a variety of scenarios. For example, in the event that the specimen is a PDF file, static analysis module 102 is configured to determine and generate additional intelligence information in a form of metadata concerning the specimen. The context may include a type of the specimen, a type, version, and/or language of an operating system in which the specimen is intended to be executed, other software components (e.g., a specific version of a PDF reader), and other possible environment settings (e.g., an amount of a memory, a type of a processor, date and time of the operating environment), etc. Based on the context, controller 106 determines or configures an operating environment in which the specimen can be dynamically analyzed by dynamic analysis module 103. In one embodiment, a scheduler (which may be implemented as part of controller 106) provisions and configures a virtual machine (VM) from a pool of VMs based in part on the information obtained from context. In this example, an operating system of the VM may be configured or installed as the same as or similar to the one identified by the context, as well as other software components, virtual memory and processor, etc. Thus, the VM would be configured to be specifically tailored to the targeted operating environment in which the specimen is intended to be processed. As a result, although it can, dynamic analysis module 103 does not have to analyze the specimen in other unrelated or unintended operating environments or using other unrelated or unintended software components, which may significantly improve the efficiency and accuracy of the dynamic analysis.

In addition to weaponized documents, such as a PDF document, the specimen may be a malware type of document, such as a dynamically-link library (DLL). For example, when the specimen in the form of a DLL is received, a static analysis is performed on the content file by static analysis module 102. The static analysis may reveal certain specific processes that are related to the DLL in question. According to one embodiment, when a dynamic analysis is performed, those specific processes, instead of general-purpose processes, may be performed to determine whether the DLL is malicious. As a result, the speed and accuracy of the dynamic analysis can be greatly improved. Further, a static analysis may reveal only certain exported functions existed in the DLL and a dynamic analysis can focus on those existing exported functions without having to test other non-existing functions.

As mentioned above, under certain situations, a dynamic analysis may be performed prior to a static analysis, where the result of the dynamic analysis may be used by the static analysis. For example, if the specimen is a packed DLL file or an executable binary, the static analysis may not be able to fully examine the content based on heuristics. In this situation, a dynamic analysis can unpack the file during processing of the file to reveal other software components (e.g., network stack or other specific libraries). Based on the result of the dynamic analysis, the static analysis can be performed on the unpacked files using related heuristics.

Figure 5:
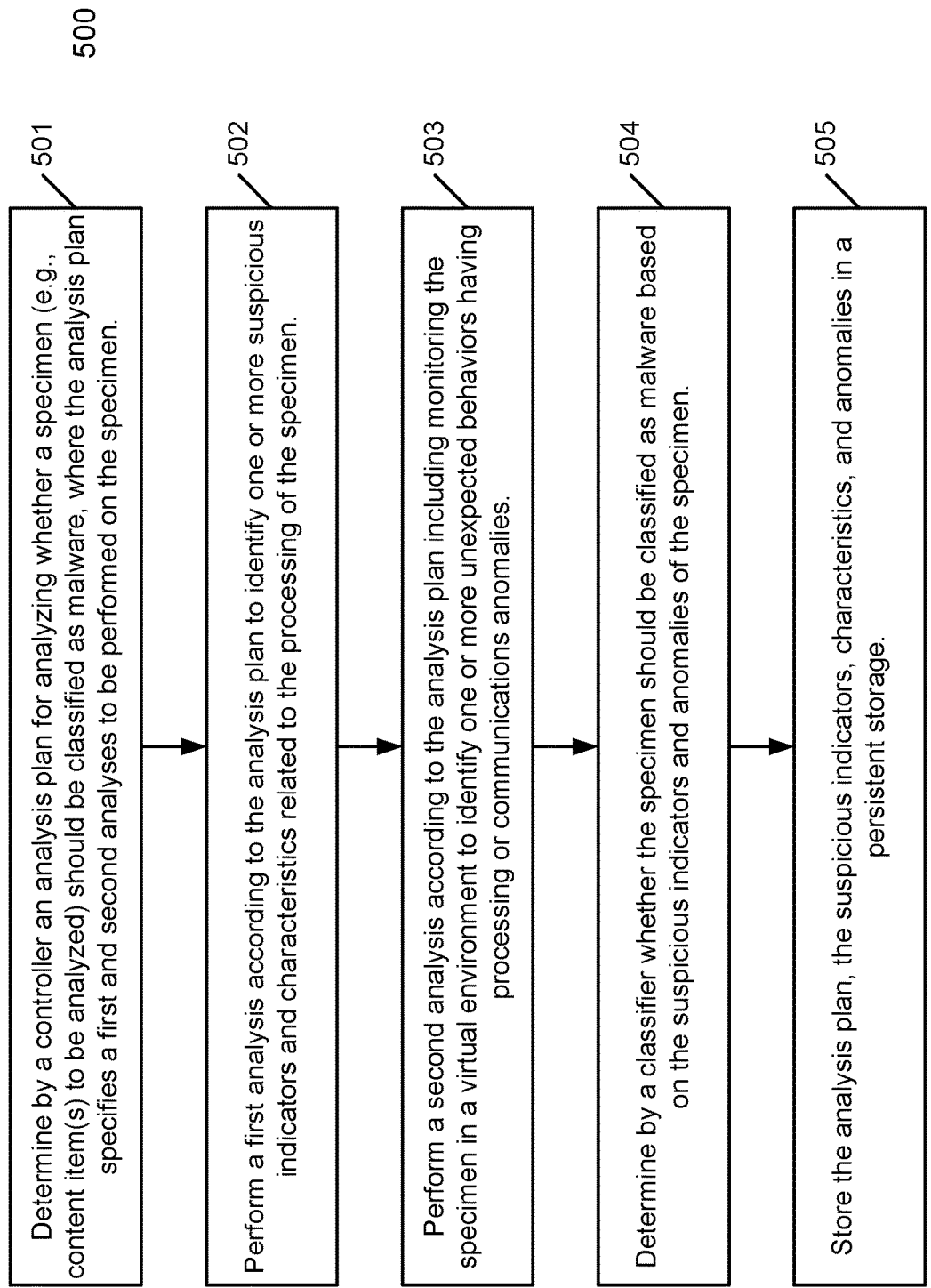
FIG. 5 is a flow diagram illustrating a method for malware detection according to one embodiment of the invention.

FIG. 5 is a flow diagram illustrating a method for malware detection according to one embodiment of the invention. Method 500 may be performed by processing logic which may include software, hardware, or a combination thereof. For example, method 500 may be performed by system 100 of FIG. 1A. Referring to FIG. 5, at block 501, a controller or control logic determines an analysis plan for analyzing whether a specimen (e.g., content item(s) to be analyzed) should be classified as malware. The analysis plan includes information specifying at least a first analysis and a second analysis to be performed on the specimen. At block 502, a first analysis is performed in accordance with the analysis plan to identify one or more suspicious indicators and one or more characteristics related to and potential useful in the processing of the specimen during the second analysis. At block 503, a second analysis is performed in accordance with the analysis plan on the specimen based on characteristics, if any, identified in the first analysis. The second analysis may include monitoring the specimen in a virtual environment to identify one or more unexpected behaviors having processing or communications anomalies. At block 504, a classifier determines whether the specimen should be classified as malware based on the suspicious indicators and the anomalies of the specimen. At block 505, the analysis plan, the suspicious indicators, characteristics, and anomalies are stored in a persistent storage device.

Note that the specific sequence order of operations as shown in FIG. 5 is described for the purpose of illustration only; other sequence orders of operations may also be performed. For example, after a static analysis has been performed to generate suspicious indicators and characteristics, the classifier may perform a classification based on the suspicious indicators and the characteristics. Based on the classification result, if the controller determines that the result is not conclusive (e.g., uncertain, neither malware nor non-malware), the controller may initiate or configure a further analysis such as a dynamic analysis. Note that in some embodiments, when the result deems to be inconclusive, it simply means an intention or attempt to capture additional suspicious indicators or characteristics in an intelligent manner base on the prior discovery. In one embodiment, an analysis (e.g., static, dynamic, or emulation analysis) may determine that a specimen is malicious, and under certain criteria there may be value in running an additional analysis or analysis steps to capture deeper malicious indicators and/or characteristics. For example, an executable or a PDF file may be declared as malicious based on some analyses. Additional analysis may be performed to capture more stages of the attack. Thus, even though the malicious determination has been made, the controller may decide to continue performing an additional analysis to capture additional threat intelligence about the specimen, which in turn result in additional blocking capability.

In another example, referring back to FIG. 1A or 1B, a specimen is a packed file and captured by controller 106. After a static analysis, static analysis module 102 reveals that the packed file contains no DLL. However, a dynamic analysis performed by dynamic analysis module 103 reveals there are 2 DLLs in the packed file, for example, after unpacking the packed file. Based on the information provided by static and dynamic analysis modules 102-103, controller 106 and/or classifier 105 determine that at least one further analysis is required on the unpacked files. The dynamic analysis may further reveal that the content, when executed, accesses a network, a network stack, and/or a specific library that would not be identified by the static analysis. All of the information generated from static analysis module 102 and dynamic analysis module 103 may be stored in intelligence store and available to all of the components in the system. The discrepancy may be used by the classifier 105 as a factor in classifying the specimen.

In a further example, a first static analysis performed on a specimen determines that the specimen is a packed file. In response, the controller configures a dynamic analysis or emulation performed on the specimen, which may unpack the file. A second static analysis may be performed on the unpacked file. The second static analysis may detect the evasion (also referred to as anti-detection defense or anti-analysis defense) such as virtual machine evasion. Based in part on the detected evasion, a classifier may classify the specimen as malware.

Figure 6A:
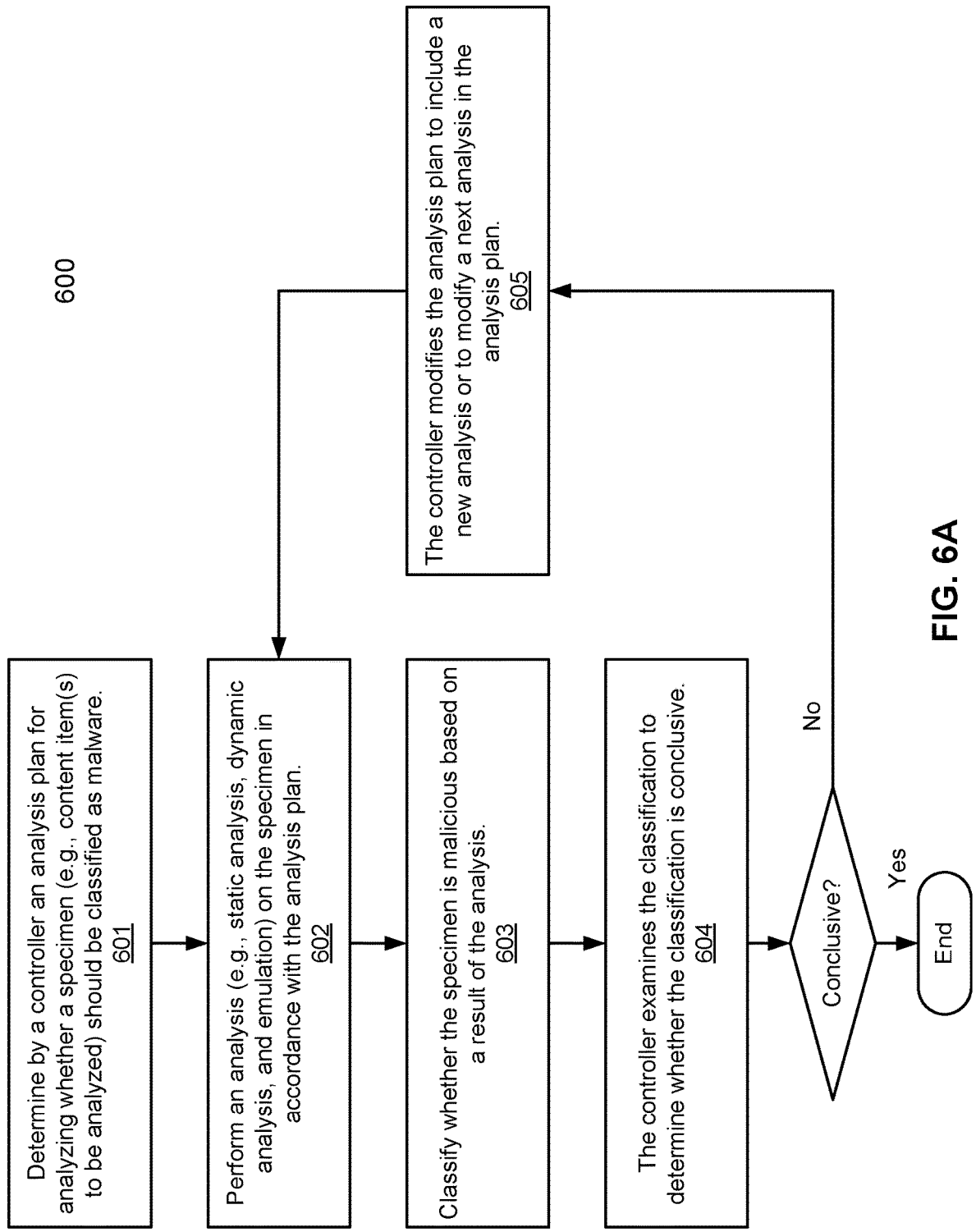
FIGS. 6A and 6B are flow diagrams illustrating a method for malware detection according to some embodiments of the invention.

FIG. 6A is a flow diagram illustrating a method for malware detection according to another embodiment of the invention. Method 600 may be performed by systems as shown in FIGS. 1A and 1B, which may be implemented in software, hardware, or a combination thereof. Referring to FIG. 6A, at block 601, a controller or control logic determines an analysis plan for analyzing whether a specimen should be classified as malware. The analysis plan includes information specifying at least one analysis to be performed on the specimen. At block 602, an analysis is performed in accordance with the analysis plan, where the analysis can be a static analysis, a dynamic analysis, or emulation as described above. At block 603, a classifier is invoked to classify the specimen based on a result of the analysis. At block 604, the controller examines the classification result to determine whether the classification is conclusive (e.g., malware or non-malware) or inconclusive (e.g., uncertain or unknown). If the classification is deemed to be conclusive, the current analysis session may end, and a malware identifier or signature may be generated if the specimen is determined to be malware. If the classification is inconclusive, at block 605, the controller may modify the analysis plan to initiate a new analysis or modify a next analysis that has been configured in the plan for further analysis. The operations as shown in FIG. 6A may be iteratively performed until the controller and/or classifier determine that a predetermined criteria (e.g., timing or conclusive result reached) has been satisfied.

Figure 6B:
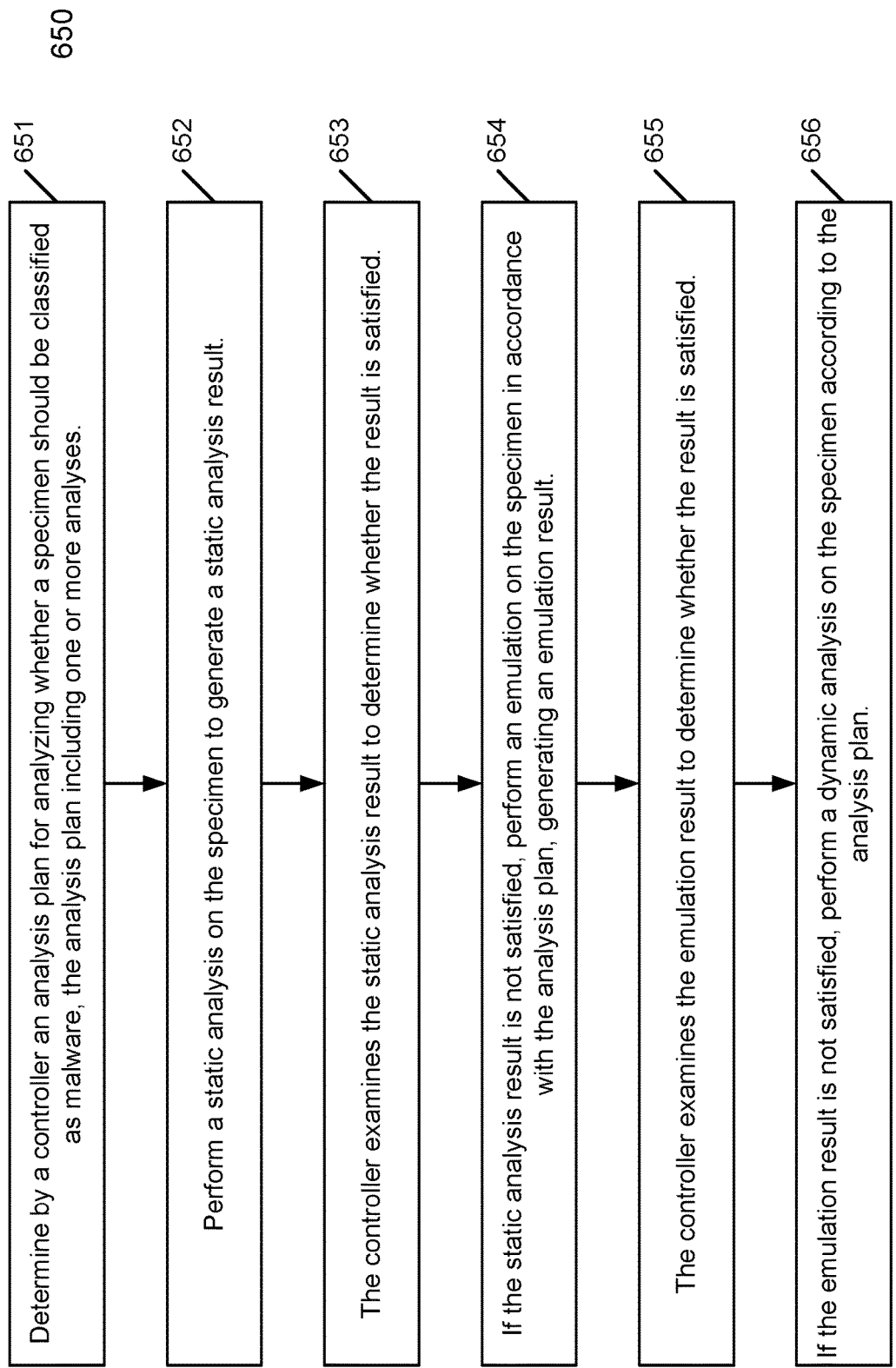

FIG. 6B is a flow diagram illustrating a method for malware detection according to another embodiment of the invention. In this example, different sequence orders of analyses of method 650 are shown for the purpose of illustration only. Referring to FIG. 6B, at block 651, a controller determines an analysis plan for analyzing whether a specimen should be classified as malware, where the analysis plan includes one or more analyses. At block 652, a static analysis is performed in accordance with the analysis plan, generating a static analysis result. At block 653, the controller examines the static analysis result to determine whether the result is satisfied. If not, at block 654, an emulation is performed on the specimen in accordance with the analysis plan. At block 655, the controller examines a result of the emulation, and if the result is not satisfied, at block 656, a dynamic analysis is performed on the specimen based on the analysis plan. The operations of FIG. 6B may also be iteratively performed until a predetermined criteria or condition is satisfied.

Figure 7:
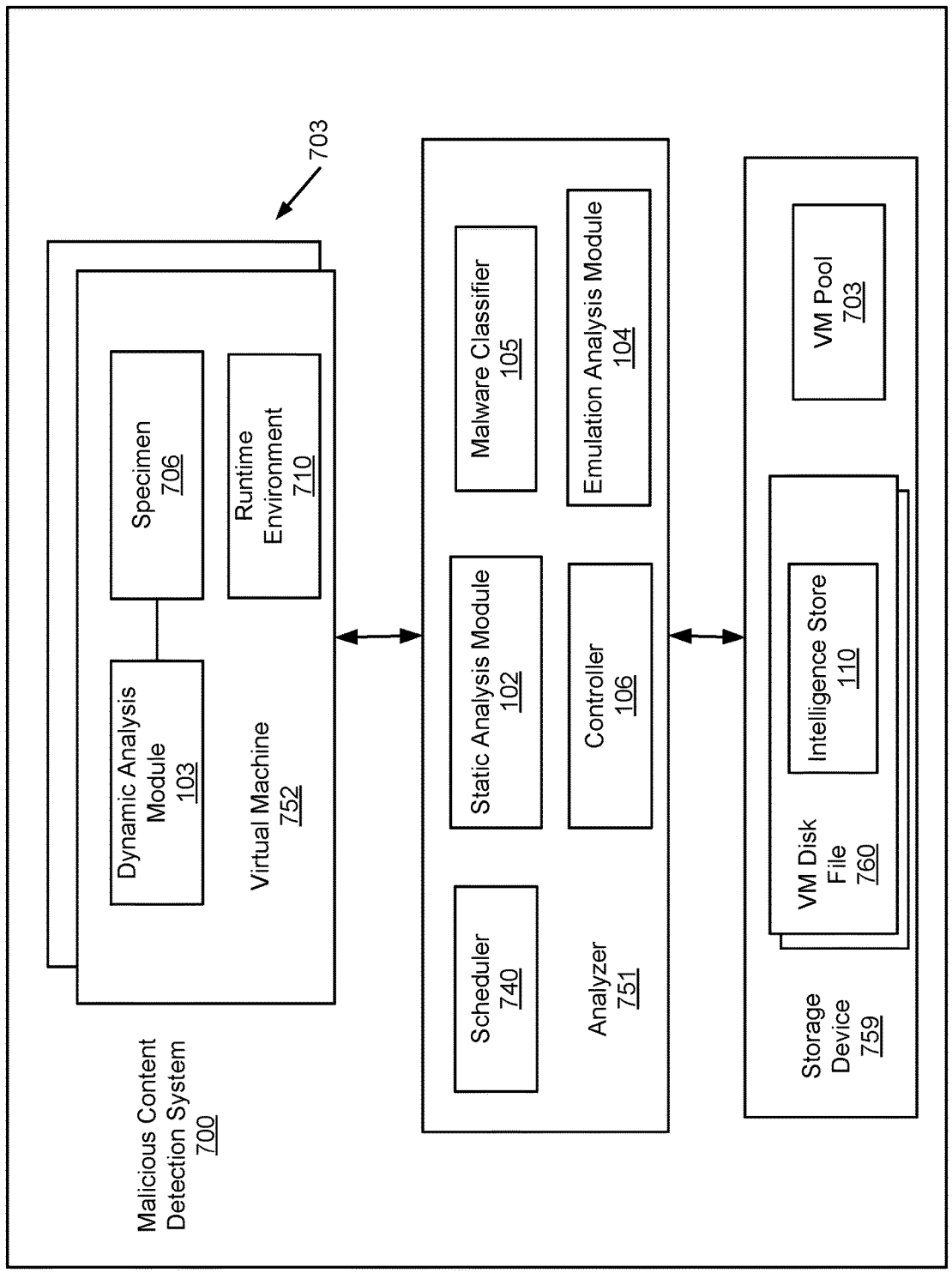
FIG. 7 is a block diagram illustrating a possible implementation of a malware detection system according to one embodiment of the invention.

FIG. 7 is a block diagram illustrating a possible implementation of a malware detection system according to one embodiment of the invention. Malware detection system 700 may be implemented as part of system 101 of FIG. 1A or system 150 of FIG. 1B. System Referring to FIG. 7, system 700 includes a host operating system (OS) (not shown) to manage or control one or more virtual machines (VMs) (also referred to as a sandboxed operating environment or simply a sandbox), where content associated with VMs 752 are stored in storage device 759 in a form of VM disk files 760.

The host OS may host a VM monitor or manager (VMM), also referred to as a hypervisor, for managing or monitoring VMs. VM 752 may be hosted by a guest OS. The host OS and the guest OS may be the same type of operating systems or different types of operating systems (e.g., Windows™, Linux™, Unix™, Mac OS™, iOS™, etc.) or different versions thereof. A VM is a simulation of a machine (abstract or real) that is usually different from the target machine (where it is being simulated on). Virtual machines may be based on specifications of a hypothetical computer or emulate the computer architecture and functions of a real world computer. A virtual machine referred to herein can be any type of virtual machine, such as, for example, hardware emulation, full virtualization, para-virtualization, and operating system-level virtualization virtual machines.

The Host OS further hosts or provides an operating environment to analyzer 751, including static analysis module 102, malware classifier 105, controller 106, and emulation analysis module 104, as described above. According to one embodiment, when a specimen 706 is received for a dynamic analysis (as opposed to a static analysis performed by static analysis module 102), a scheduler 740 is configured to identify and select, or configure a VM, in this example VM 752, from a VM pool 703 that has been configured to closely simulate a target operating environment (e.g., particular version of an OS with particular versions of certain software installed therein) in which specimen 706 is to be analyzed. In one embodiment, based on an analysis result performed by static analysis module 102, a VM such as VM 752 is configured and scheduled by scheduler 740 specifically tailored to an operating environment 710 in which specimen 706 is intended for execution. The scheduler 740 then launches VM 752 in which dynamic analysis module 103 is running within VM 752 and configured to monitor activities and behavior of specimen 706. An emulation analysis may be performed by emulation analysis module 104 as described above. Furthermore, the analysis results generated by static analysis module 102 and/or dynamic analysis module 103 may be stored in corresponding VM disk files 760, for example, as part of intelligence store 110.

Figure 8:
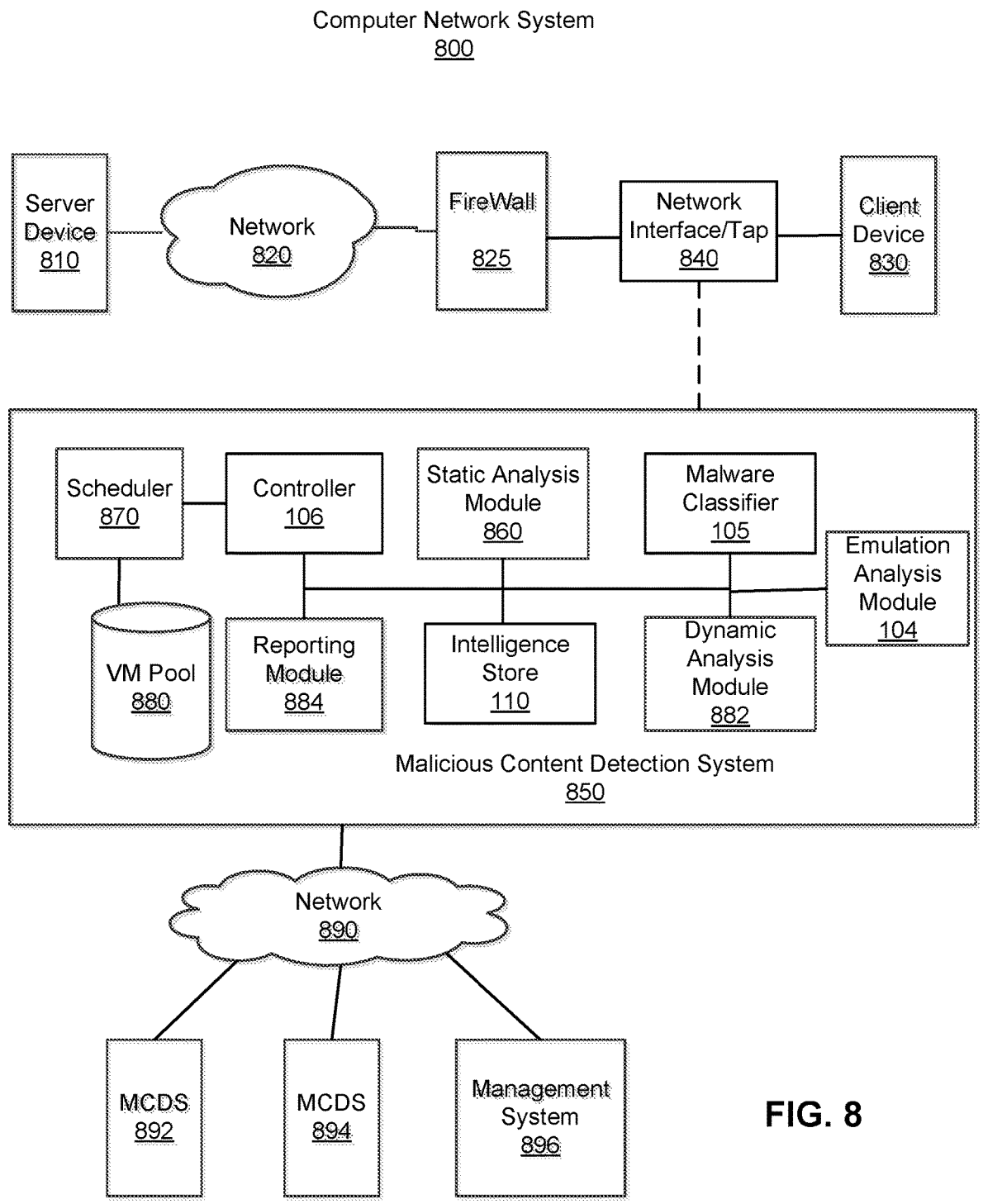
FIG. 8 is a block diagram of a computer network system deploying a malicious content detection system according to one embodiment of the invention.

FIG. 8 is a block diagram of an illustrative computer network system 800 having a malicious content detection system 850 in accordance with a further illustrative embodiment. In this example, the malicious content detection system is a Web content malware detection system. The malicious content detection system 850 may represent any of the malicious content detection systems described above, such as, for example, detection systems 101 of FIG. 1A, where static analysis module 860 may represent static analysis module 102 and dynamic analysis module 882 may represent dynamic analysis module 103. The malicious content detection system 850 includes controller 106 to coordinate, via an analysis plan, a static analysis and a dynamic analysis in which one analysis may utilize intelligent information produced by another analysis and stored in intelligence store 110. Classifier 105 is to classify whether a particular specimen should be classified as malware based on the static and dynamic analyses. In addition, controller 106 further examines the results of a static analysis and a dynamic analysis to determine whether a further static analysis, dynamic analysis, or both are needed. If so, controller 106 configures or modifies an analysis plan to include at least one additional analysis to be performed, for example, based on the intelligent information provided from the previous analysis, as described above.

The malicious content detection system 850 is illustrated with a server device 810 and a client device 830, each coupled for communication via a communication network 820. In various embodiments, there may be multiple server devices and multiple client devices sending and receiving data to/from each other, and the same device can serve as either a server or a client in separate communication sessions. Although FIG. 8 depicts data transmitted from the server device 810 to the client device 830, either device can transmit and receive data from the other.

Note that throughout this application, network content is utilized as an example of a specimen or specimens for malicious content detection purposes; however, other types of content can also be applied. Network content may include any data transmitted over a network (i.e., network data). Network data may include text, software, images, audio, or other digital data. An example of network content includes web content, or any network data that may be transmitted using a Hypertext Transfer Protocol (HTTP), Hypertext Markup Language (HTML) protocol, or be transmitted in a manner suitable for display on a Web browser software application. Another example of network content includes email messages, which may be transmitted using an email protocol such as Simple Mail Transfer Protocol (SMTP), Post Office Protocol version 3 (POP3), or Internet Message Access Protocol (IMAP4). A further example of network content includes Instant Messages, which may be transmitted using an Instant Messaging protocol such as Session Initiation Protocol (SIP) or Extensible Messaging and Presence Protocol (XMPP). In addition, network content may include any network data that is transferred using other data transfer protocols, such as File Transfer Protocol (FTP).

The malicious network content detection system 850 may monitor exchanges of network content (e.g., Web content) in real-time rather than intercepting and holding the network content until such time as it can determine whether the network content includes malicious network content. The malicious network content detection system 850 may be configured to inspect exchanges of network content over the communication network 820, identify suspicious network content, and analyze the suspicious network content using a virtual machine to detect malicious network content. In this way, the malicious network content detection system 850 may be computationally efficient and scalable as data traffic volume and the number of computing devices communicating over the communication network 820 increases. Therefore, the malicious network content detection system 850 may not become a bottleneck in the computer network system 800.

The communication network 820 may include a public computer network such as the Internet, in which case a firewall 825 may be interposed between the communication network 820 and the client device 830. Alternatively, the communication network may be a private computer network such as a wireless telecommunication network, wide area network, or local area network, or a combination of networks. Though the communication network 820 may include any type of network and be used to communicate different types of data, communications of web data may be discussed below for purposes of example.

The malicious network content detection system 850 is shown as being coupled with the network 820 by a network interface or tap 840 (e.g., a data/packet capturing device). The network tap 840 may include a digital network tap configured to monitor network data and provide a copy of the network data to the malicious network content detection system 850. Network data may comprise signals and data that are transmitted over the communication network 820 including data flows from the server device 810 to the client device 830. In one example, the network tap 840 monitors and copies the network data without an appreciable decline in performance of the server device 810, the client device 830, or the communication network 820. The network tap 840 may copy any portion of the network data, for example, any number of data packets from the network data. In embodiments where the malicious content detection system 850 is implemented as a dedicated appliance or a dedicated computer system, the network tap 840 may include an assembly integrated into the appliance or computer system that includes network ports, network interface card and related logic (not shown) for connecting to the communication network 820 to non-disruptively "tap" traffic thereon and provide a copy of the traffic to the heuristic module 860. In other embodiments, the network tap 840 can be integrated into a firewall, router, switch or other network device (not shown) or can be a standalone component, such as an appropriate commercially available network tap. In virtual environments, a virtual tap (vTAP) can be used to copy traffic from virtual networks.

The network tap 840 may also capture metadata from the network data. The metadata may be associated with the server device 810 and/or the client device 830. For example, the metadata may identify the server device 810 and/or the client device 830. In some embodiments, the server device 810 transmits metadata which is captured by the tap 840. In other embodiments, a heuristic module 860 (described herein) may determine the server device 810 and the client device 830 by analyzing data packets within the network data in order to generate the metadata. The term, "content," as used herein may be construed to include the intercepted network data and/or the metadata unless the context requires otherwise.

The malicious network content detection system 850 may include a static analysis module 860, a heuristics database (not shown), a scheduler 870, a virtual machine pool 880, a dynamic analysis module 882, an emulator (not shown), and a reporting module 884. In some embodiments, the network tap 840 may be contained within the malicious network content detection system 850. The controller 106 is to coordinate, via an analysis plan, at least one of a static analysis, a dynamic analysis, and an emulation, in which one process may utilize intelligent information produced by another process and stored in intelligence store 110. Classifier 105 is to classify whether a particular specimen should be classified as malware based on the static analysis, dynamic analysis, and/or the emulation. In addition, controller 106 further examines the results of a static analysis and a dynamic analysis to determine whether a further static analysis, dynamic analysis, or both are needed. If so, controller 106 configures a new analysis plan or modifies an existing analysis plan to include at least one additional analysis to be performed, for example, based on the intelligent information provided from the previous analysis, as described above. Controller 106 may monitor or receive a feedback from any of the static analysis module, dynamic analysis module, emulator, and/or the classifier. Based on a result of any of these components, the controller 106 may modify the analysis plan to include a further analysis or alternatively, it may terminate the current analysis if it is determined the result is conclusive.

The static analysis module 860 receives the copy of the network data from the network tap 840 and applies heuristics to the data to determine if the network data might contain suspicious network content. The heuristics applied by the static analysis module 860 may be based on data and/or rules stored in the heuristics database (not shown). The static analysis module 860 may examine the image of the captured content without executing or opening the captured content. For example, the static analysis module 860 may examine the metadata or attributes of the captured content and/or the code image (e.g., a binary image of an executable) to determine whether a certain portion of the captured content matches a predetermined pattern or signature that is associated with a particular type of malicious content. In one example, the static analysis module 860 flags network data as suspicious after applying a heuristic analysis. This detection process is also referred to as static malicious content detection. The suspicious network data may then be provided to the scheduler 870. In some embodiments, the suspicious network data is provided directly to the scheduler 870 with or without buffering or organizing one or more data flows.

When a characteristic of the packet, such as a sequence of characters or keyword, is identified that meets the conditions of a heuristic, a suspicious characteristic of the network content is identified. The identified characteristic may be stored for reference and analysis. In some embodiments, the entire packet may be inspected (e.g., using deep packet inspection techniques) and multiple characteristics may be identified before proceeding to the next step. In some embodiments, the characteristic may be determined as a result of an analysis across multiple packets comprising the network content. A score related to a probability that the suspicious characteristic identified indicates malicious network content is determined.

The static analysis module 860 may also provide a priority level for the packet and/or the features present in the packet. The scheduler 870 may then load and configure a virtual machine from the virtual machine pool 880 in an order related to the priority level, and dispatch the virtual machine to the dynamic analysis module 882 to process the suspicious network content.

The static analysis module 860 may provide the packet containing the suspicious network content to the scheduler 870, along with a list of the features present in the packet and the malicious probability scores associated with each of those features. Alternatively, the static analysis module 860 may provide a pointer to the packet containing the suspicious network content to the scheduler 870 such that the scheduler 870 may access the packet via a memory shared with the static analysis module 860. In another embodiment, the static analysis module 860 may provide identification information regarding the packet to the scheduler 870 such that the scheduler 870, or virtual machine may query the static analysis module 860 for data regarding the packet as needed.

The scheduler 870 may store the received packets, for example, in a queue, and determines an order of processing of the suspicious network content, based on associated priorities assigned to each. The priorities may be based, at least in part, on the results of prior analysis. The scheduler 870 also determines the length of time for processing the suspicious network content based, at least in part, on the results of prior analysis and the waiting queue of network content.

The scheduler 870 may identify an operating environment to be used to process the suspicious network content in a virtual machine, for example, based, at least in part, on the results of the static analysis or other prior analysis. A virtual machine may itself be executable software that is configured with the identified operating environment. The virtual machine may be retrieved from the virtual machine pool 880. Furthermore, the scheduler 870 may identify, for example, an application program required to process the packets, for example, a Web browser, and retrieve a virtual machine equipped with the web browser.

The scheduler 870 may retrieve and configure the virtual machine with features that may include ports that are to receive the network data, select device drivers that are to respond to the network data, and other devices that can respond to the network data. In some embodiments, prior analyses, such as the static analysis, may identified these features. These features may be provided virtually within the virtual environment.

The virtual machine pool 880 may be configured to store one or more virtual machines. The virtual machine pool 880 may include software and/or a storage medium capable of storing software. The virtual machine pool 880 may store any number of distinct virtual machines.

The dynamic analysis module 882 simulates the receipt and/or processing of the network content to analyze the effects (e.g., behaviors) of the network content. There may be multiple dynamic analysis modules 882 to simulate multiple streams of network content. The dynamic analysis module 882 may be configured to monitor the virtual machine for indications that the suspicious network content is in fact malicious network content. Such indications may include unusual network transmissions, unusual changes in performance, and the like. This detection process is referred to as a dynamic malicious content detection.

The dynamic analysis module 882 may flag the suspicious network content as malicious network content according to the observed behavior during processing of the content within the virtual machine. The reporting module 884 may issue alerts indicating the presence of malware, and using pointers and other reference information, identify the packets of the network content containing the malware. This information may include all or an appropriate portion of that stored for the network content in the intelligence store 110. Additionally, the server device 810 may be added to a list of malicious network content providers, and future network transmissions originating from the server device 810 may be blocked from reaching their intended destinations, e.g., by firewall 825.

The computer network system 800 may also include a further communication network 890, which couples the malicious content detection system (MCDS) 850 with one or more other MCDS, of which MCDS 892 and MCDS 894 are shown, and a management system 896, which may be implemented as a Web server having a Web interface. The communication network 890 may, in some embodiments, be coupled for communication with or part of network 820. The management system 896 is responsible for managing the MCDS 850, 892, 894 and providing updates to their operation systems and software programs. Also, the management system 896 may cause malware signatures generated by any of the MCDS 850, 892, 894 to be shared with one or more of the other MCDS 850, 892, 894, for example, on a subscription basis. Moreover, the malicious content detection system as described in the foregoing embodiments may be incorporated into one or more of the MCDS 850, 892, 894, or into all of them, depending on the deployment. Also, the management system 896 itself or another dedicated computer station may incorporate the malicious content detection system in deployments where such detection is to be conducted at a centralized resource.

Further information regarding an embodiment of a malicious content detection system can be had with reference to U.S. Pat. No. 8,171,553, the disclosure of which being incorporated herein by reference in its entirety.

As described above, the detection or analysis performed by the heuristic module 860 may be referred to as static detection or static analysis, which may generate a first score (e.g., a static detection score) according to a first scoring scheme or algorithm. The detection or analysis performed by the analysis engine 882 is referred to as dynamic detection or dynamic analysis, which may generate a second score (e.g., a dynamic detection score) according to a second scoring scheme or algorithm. The first and second scores may be combined, according to a predetermined algorithm, to derive a final score indicating the probability that a malicious content suspect is indeed malicious. Where other analyses are performed, they may result in additional scores may be combined to derive the final score.

Furthermore, detection systems 850 and 892-894 may be deployed in a variety of distribution ways. For example, detection system 850 may be deployed as a detection appliance at a client site to detect any specimen, for example, at a local area network (LAN) of the client. In addition, any of MCDS 892 and MCDS 894 may also be deployed as dedicated data analysis systems. Systems 850 and 892-894 may be configured and managed by a management system 896 over network 890, which may be a LAN, a wide area network (WAN) such as the Internet, or a combination of both. Management system 896 may be implemented as a Web server having a Web interface to allow an administrator of a client (e.g., corporation entity) to log in to manage detection systems 850 and 892-894. For example, an administrator may able to activate or deactivate certain functionalities of malicious content detection systems 850 and 892-894 or alternatively, to distribute software updates such as malicious content definition files (e.g., malicious signatures or patterns) or rules, etc. Furthermore, a user can submit via a Web interface specimen to be analyzed, for example, by dedicated data analysis systems 892-894. As described above, malicious content detection includes static detection and dynamic detection. Such static and dynamic detections can be distributed amongst different systems over a network. For example, static detection may be performed by detection system 850 at a client site, while dynamic detection of the same content can be offloaded to the cloud, for example, by any of detection systems 892-894. Other configurations may exist.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A system for adjusting malware analysis of a specimen received as input, the system comprising:
   a data storage device being hardware that is configured to store control information that identifies (i) a first plurality of analyses and (ii) an order of the first plurality of analyses to be conducted on the specimen;

a first analysis module being software that is configured, upon execution, to conduct, in accordance with the control information, at least one or more analysis of a first type of analysis on the specimen, wherein the one or more analysis of the first type of analysis included as a portion of the first plurality of analyses;

a second analysis module being software that is configured, upon execution, to conduct, in accordance with the control information, at least one or more analysis of a second type of analysis on the specimen, wherein the one or more analysis of the second type of analysis included as a portion of the first plurality of analyses; and a controller communicatively coupled to the data storage device, the first analysis module, and the second analysis module, the controller to modify the control information in response to feedback information based on results from at least one of the first plurality of analyses conducted by the first analysis module or the second analysis module, the modified control information to change the malware analysis of the specimen from being conducted in accordance with the first plurality of analyses to being conducted in accordance with a second plurality of analyses different from the first plurality of analyses in analysis type or in order of analyses.

2. The system of claim 1, wherein the first analysis module corresponds to a static analysis module being software configured to conduct, in accordance with the control information, one or more analysis of the first type of analysis on the specimen for characteristics that suggest the specimen includes malware.

3. The system of claim 2, wherein the second analysis module corresponds to a dynamic analysis module being software configured to conduct, in accordance with the control information, one or more analysis of the second type of analysis on the specimen to detect at least one unexpected behavior that occurs during processing of the specimen within one or more virtual machines.

4. The system of claim 3, wherein the controller being configured to modify content of the control information to modify an order of the first plurality of analyses in response to receipt of the feedback information based on results from at least one of (i) the one or more analysis conducted by the static analysis module and (ii) the one or more analysis conducted by the dynamic analysis module.

5. The system of claim 3, wherein the controller modifies content of the control information by including an additional analysis that is conducted by the dynamic analysis module between or after a first analysis and a second analysis, the first analysis being one of the one or more analysis of the first type of analysis conducted by the static analysis module and the second analysis being one of the one or more analysis of the second type of analysis conducted by the dynamic analysis module.

6. The system of claim 2, wherein the controller modifies content of the control information by including an additional analysis that is conducted by the static analysis module after an analysis of the one or more analysis being conducted by the dynamic analysis module.

7. The system of claim 4, wherein the controller to modify content of the control information that modifies an analysis protocol and parameters associated with the first plurality of analyses in response to the feedback information.

8. The system of claim 7, wherein the analysis protocol and parameters include a type of operating system and its version used by the one or more virtual machines conducting an analysis that is part of the first plurality of analyses.

9. The system of claim 7, wherein the analysis protocol and parameters include a length of time to conduct a dynamic analysis on the specimen, the dynamic analysis being one of the first plurality of analyses.

10. The system of claim 7, wherein the analysis protocol and parameters include a type or location of monitors to deploy to monitor behaviors, including least one unexpected behavior, that occurs during processing of the specimen within the one or more virtual machines.

11. The system of claim 1, wherein the controller to modify content of the control information to modify an order of the first plurality of analyses in response to receipt of the feedback information.

12. The system of claim 11, wherein the feedback information includes results from the analysis of the specimen for at least one or more characteristics that suggest the specimen includes malware.

13. The system of claim 11, wherein the feedback information includes results from the analysis of the specimen for the at least one unexpected behavior that occurs during processing of the specimen within one or more virtual machines.

14. The system of claim 1, wherein the controller modifies content of the control information by including an additional analysis that is conducted between an analysis conducted by the first analysis module and an analysis conducted by the second analysis module.

15. The system of claim 1, wherein the controller modifies content of the control information by including an additional analysis different than any of the first plurality of analyses.

16. The system of claim 1, wherein the controller modifies the control information by terminating at least one upcoming analysis in accordance with the control information to be conducted by either the first analysis module or the second analysis module.

17. The system of claim 1, wherein the second analysis module corresponds to a dynamic analysis module being software to conduct, in accordance with the control information, one or more analysis of the specimen to detect at least one unexpected behavior that occurs during processing of the specimen within one or more virtual machines and the controller modifies content of the control information after conducting a first analysis of the one or more analysis by modifying an operating environment of the one or more virtual machines for a second analysis subsequent to the first analysis in the control information.

18. The system of claim 1 further comprising:
a classifier communicatively coupled to the data storage device, the classifier to determine whether the specimen should be classified as malicious based on results of (i) one or more analysis conducted on the specimen by the first analysis module, (ii) one or more analysis conducted on the specimen by the second analysis module, or (iii) the one or more analysis conducted on the specimen by the first analysis module and the one or more analysis being conducted on the specimen by the second analysis module.

19. The system of claim 18 further comprising:
an emulation analysis module communicatively coupled to the controller, the emulation analysis module being software to emulate operations associated with a processing of the specimen in context with an emulated computer application or in context with an emulated dynamic library, wherein the controller to further coordinate at least an order of the emulated operations being a portion of the first plurality of analyses.

20. The system of claim 19, wherein at least one of the emulated operations include unpacking of the specimen, the specimen includes a file provided for analysis.

21. The system of claim 1, wherein operability of the system is being managed by a management system implemented as a web server.

22. The system of claim 1, wherein the specimen is provided as input via a web interface.

23. The system of claim 1, wherein the one or more analysis of the first type of analysis being conducted by the first analysis module operating at a client site and the one or more analysis of the second type of analysis being conducted by the second analysis module operating within a cloud network.

24. The system of claim 1, wherein at least a portion of the system being deployed within a cloud network.

25. A non-transitory machine-readable medium storing a plurality of modules, when executed by a processor, cause the processor to perform operations for detecting malware in a specimen, the non-transitory machine-readable medium comprising:
a first analysis module being configured, during execution by the processor, to conduct one or more analysis associated with at least a first type of analysis on the specimen in accordance with a first plurality of analyses and an order of the first plurality of analyses to be conducted on the specimen;
a second analysis module being configured, during execution by the processor, to conduct one or more analysis associated with at least second type of analysis on the specimen, the second type of analysis being different than the first type of analysis conducted by the first analysis module; and
a controller being configured, during execution by the processor, to receive feedback information based on results from one or more analysis associated with at least the first type of analysis corresponding to at least one of the first plurality of analyses conducted by the first analysis module or one or more analysis associated with at least the second type of analysis corresponding to at least one of the first plurality of analyses conducted by the second analysis module to change the malware analysis of the specimen from being conducted in accordance with the first plurality of analyses and the order of the first plurality of analyses to being conducted in accordance with a second plurality of analyses and an order of the second plurality of analyses being different than at least the order of the first plurality of analyses.

26. The non-transitory machine-readable medium of claim 25, wherein the first analysis module corresponds to a static analysis module being configured to conduct, in accordance with the first plurality of analyses and the order of the first plurality of analyses, the one or more analysis of the first type of analysis on the specimen for characteristics that suggest the specimen includes malware.

27. The non-transitory machine-readable medium of claim 26, wherein the second analysis module corresponds to a dynamic analysis module being configured to conduct, in accordance with the first plurality of analyses and the order of the first plurality of analyses, the one or more analysis of the second type of analysis on the specimen to detect at least one unexpected behavior that occurs during processing of the specimen within one or more virtual machines.

28. The non-transitory machine-readable medium of claim 27, wherein the controller modifies content associated with the first plurality of analyses and the order of the first plurality of analyses by at least including an additional analysis that is conducted by the static analysis module after an analysis of the one or more analysis associated with at least the second type of analysis by the dynamic analysis module.

29. The non-transitory machine-readable medium of claim 25, wherein the controller being configured to modify the order of the first plurality of analyses in response to receipt of the feedback information based on results from at least one of (i) the one or more analysis conducted by the first analysis module and (ii) the one or more analysis conducted by the second analysis module.

30. The non-transitory machine-readable medium of claim 25, wherein the controller to modify the order of the first plurality of analyses into the order of the second plurality of analyses in response to receipt of the feedback information.

31. The non-transitory machine-readable medium of claim 30, wherein the feedback information includes results from the one or more analysis associated with at least the first type of analysis on the specimen for at least one or more characteristics that suggest the specimen includes malware.

32. The non-transitory machine-readable medium of claim 25, wherein the feedback information includes results from the one or more analysis on the specimen by the first analysis module for at least one unexpected behavior that occurs during processing of the specimen within one or more virtual machines.

33. The non-transitory machine-readable medium of claim 25, wherein the controller modifies content associated with the first plurality of analyses and the order of the first plurality of analyses by including an additional analysis that is conducted between the one or more analysis conducted by the first analysis module and the one or more analysis conducted by the second analysis module.

34. The non-transitory machine-readable medium of claim 25, wherein the controller modifies content associated with the first plurality of analyses and the order of the first plurality of analyses by including an additional analysis different than any of the first plurality of analyses.

35. The non-transitory machine-readable medium of claim 25, wherein the controller modifies content associated with the first plurality of analyses and the order of the first plurality of analyses by including an additional analysis that is conducted by the second analysis module between or after a first analysis and a second analysis, the first analysis being one of the one or more analysis associated with the first plurality of analyses conducted by the first analysis module and the second analysis being one of the one or more analysis associated with the second plurality of analyses conducted by the second analysis module.

36. The non-transitory machine-readable medium of claim 25 further storing a module that, during execution by the processor, cause the processor to perform further operations for detecting malware in a specimen, the non-transitory machine-readable medium comprising:
a classifier module that, during execution by the processor, determines whether the specimen should be classified as malicious based on results of (i) the one or more analysis conducted on the specimen by the first analysis module, (ii) the one or more analysis conducted on the specimen by the second analysis module, or (iii) the one or more analysis conducted on the specimen by the first analysis module and the one or more analysis being conducted on the specimen by the second analysis module.

37. A computer implemented method of detecting malware in a specimen of computer content or network traffic, the method comprising:
    conducting, by a first analysis module executed by a processor, at least one analysis associated with a first type of analysis on the specimen in accordance with a first plurality of analyses and an order of the first plurality of analyses;
    conducting, by a second analysis module executed by the processor, at least one analysis associated with a second type of analysis on the specimen different than the first type of analysis conducted by the first analysis module; and
    modifying, by a controller executed by the processor, an analysis on the specimen by at least modifying information associated with the first plurality of analyses or the order of the first plurality of analyses in response to feedback information based on results from the at least one analysis of the first plurality of analyses conducted by the first analysis module, the modified control information changes a malware analysis of the specimen from being conducted in accordance with the first plurality of analyses to being conducted in accordance with a second plurality of analyses different in analysis type or in order of analyses than the first plurality of analyses.

38. The computer implemented method of claim 37, wherein the first analysis module corresponds to a static analysis module being configured to conduct, in accordance with the first plurality of analyses and the order of the first plurality of analyses, the at least one analysis associated with the first type of analysis on the specimen for characteristics that suggest the specimen includes malware.

39. The computer implemented method of claim 38, wherein the second analysis module corresponds to a dynamic analysis module being configured to conduct, in accordance with the first plurality of analyses and the order of the first plurality of analyses, the at least one analysis associated with the second type of analysis on the specimen to detect at least one unexpected behavior that occurs during processing of the specimen within one or more virtual machines.

40. The computer implemented method of claim 39, wherein the controller modifies content associated with the first plurality of analyses and the order of the first plurality of analyses by at least including an additional analysis that is conducted by the static analysis module after an analysis of the at least one analysis associated with the second type of analysis by the dynamic analysis module.

41. The computer implemented method of claim 37, wherein the controller to modify the order of the first plurality of analyses in response to receipt of the feedback information based on results from at least one of (i) the at least one analysis conducted by the first analysis module and (ii) the at least one analysis conducted by the second analysis module.

42. The computer implemented method of claim 37, wherein the controller to modify the order of the first plurality of analyses into the order of the second plurality of analyses in response to receipt of the feedback information.

43. The computer implemented method of claim 42, wherein the feedback information includes results from the at least one analysis associated with at least the first type of analysis on the specimen for at least one or more characteristics that suggest the specimen includes malware.

44. The computer implemented method of claim 37, wherein the feedback information includes results from the at least one analysis on the specimen by the first analysis module for at least one unexpected behavior that occurs during processing of the specimen within one or more virtual machines.

45. The computer implemented method of claim 37, wherein the controller modifies the information associated with the first plurality of analyses and the order of the first plurality of analyses by including an additional analysis that is conducted between the at least one analysis conducted by the first analysis module and the at least one analysis conducted by the second analysis module.

46. The computer implemented method of claim 37, wherein the controller modifies content associated with the first plurality of analyses and the order of the first plurality of analyses by including an additional analysis different than any of the first plurality of analyses.

47. The computer implemented method of claim 37, wherein the controller modifies content associated with the first plurality of analyses and the order of the first plurality of analyses by including an additional analysis that is conducted by the second analysis module between or after a first analysis and a second analysis, the first analysis being one of the at least one analysis of the first plurality of analyses conducted by the first analysis module and the second analysis being one of the at least one analysis of the first plurality of analyses conducted by the second analysis module.

48. The computer implemented method of claim 37 further storing a module that, during execution by the processor, cause the processor to perform further operations for detecting malware in a specimen, the non-transitory machine-readable medium comprising:
    a classifier module that, during execution by the processor, determines whether the specimen should be classified as malicious based on results of (i) the at least one analysis conducted on the specimen by the first analysis module, (ii) the at least one analysis conducted on the specimen by the second analysis module, or (iii) the at least one analysis conducted on the specimen by the first analysis module and the at least one analysis being conducted on the specimen by the second analysis module.

49. The computer implemented method of claim 37, wherein the specimen is provided as input via a web interface.

50. The computer implemented method of claim 37, wherein the conducting of the at least one analysis by the first analysis module is performed at a client site and the conducting of the at least one analysis is performed by the second analysis module one or more analysis of the second type of analysis is performed at a cloud network.

51. The computer implemented method of claim 37, wherein the conducting of operations is performed by the first analysis module deployed at a client site and the conducting of operations by the second analysis module is performed by the second analysis module being deployed within a cloud network.

52. The computer implemented method of claim 37, wherein at least one of the first analysis module and the second analysis module are deployed within a cloud network.

* * * * *